US012798112B2

(12) United States Patent
Goss et al.

(10) Patent No.: US 12,798,112 B2
(45) Date of Patent: Nov. 17, 2026

(54) SYSTEM AND METHOD FOR REALTIME FEEDBACK LOOP FOR MULTI-SENSOR APPLICATIONS

(71) Applicant: BrightAI Corporation, San Francsico, CA (US)

(72) Inventors: Ryan James Goss, Prior Lake, MN (US); Graham Ferris, Savage, MN (US); Raphael Tessmer, Pasadena, CA (US); Kiran Kumar Bharwani, San Ramon, CA (US); Robert Parker, Hillsborough, CA (US)

(73) Assignee: BrightAI Corporation, Palo Alto, CA (US)

( * ) Notice: Subject to any disclaimer, the term of this patent is extended or adjusted under 35 U.S.C. 154(b) by 0 days.

(21) Appl. No.: 18/885,398

(22) Filed: Sep. 13, 2024

(65) Prior Publication Data

US 2025/0130590 A1 Apr. 24, 2025

Related U.S. Application Data

(63) Continuation-in-part of application No. 18/492,662, filed on Oct. 23, 2023.

(Continued)

(51) Int. Cl.

*F16L 55/179* (2006.01)
*B25J 9/16* (2006.01)
*B25J 11/00* (2006.01)
*B25J 19/02* (2006.01)
*F16L 55/18* (2006.01)

(Continued)

(52) U.S. Cl.

CPC ......... *B25J 11/0055* (2013.01); *B25J 9/1664* (2013.01); *B25J 9/1697* (2013.01); *B25J 19/023* (2013.01); *F16L 55/179* (2013.01); *F16L 55/18* (2013.01); *F16L 55/265* (2013.01);

(Continued)

(58) Field of Classification Search

CPC ....... B25J 9/1664; B25J 9/1694; G05D 1/246; G05D 2101/15; G05D 2105/89; G05D 2111/54; G05D 2111/67; G05D 2107/50; G06N 20/00; F16L 2101/30; F16L 55/18; F16L 2101/10

See application file for complete search history.

(56) References Cited

U.S. PATENT DOCUMENTS 5,662,587 A 9/1997 Grundfest et al.
6,056,017 A 5/2000 Kamiyama et al.

(Continued)

FOREIGN PATENT DOCUMENTS

CN 204083823 U * 1/2015

OTHER PUBLICATIONS

CN204083823U EPO Translation (Year: 2015).*

(Continued)

*Primary Examiner* — Anshul Sood
(74) *Attorney, Agent, or Firm* — Shumaker & Sieffert, P.A.

(57) ABSTRACT

A method for assessing, by a robot, a feature of an environment based on data from one of the plurality of sensors, wherein the robot is positioned in the environment includes comparing, by the robot, the feature of the environment to an expected feature of the environment; creating, by the robot, a feedback loop based on the comparing step; and adjusting an operational condition of the robot based on the feedback loop.

18 Claims, 23 Drawing Sheets

Related U.S. Application Data

(60) Provisional application No. 63/571,263, filed on Mar. 28, 2024.

(51) Int. Cl.

| | |
|---|---|
| ***F16L 55/26*** | (2006.01) |
| ***F16L 55/48*** | (2006.01) |
| ***F16L 58/18*** | (2006.01) |
| ***F16L 101/10*** | (2006.01) |
| ***F16L 101/30*** | (2006.01) |

(52) U.S. Cl.
CPC ............. *F16L 55/48* (2013.01); *F16L 58/188* (2013.01); *F16L 2101/10* (2013.01); *F16L 2101/30* (2013.01)

(56) References Cited

U.S. PATENT DOCUMENTS

| | | | |
|---|---|---|---|
| 6,108,597 | A | 8/2000 | Kirchner et al. |
| 6,243,657 | B1 * | 6/2001 | Tuck .................... G01N 29/265 324/207.13 |
| 8,060,257 | B2 | 11/2011 | Close et al. |
| 8,670,866 | B2 | 3/2014 | Ziegler et al. |
| 8,759,780 | B2 | 6/2014 | Dobbs |
| 8,805,579 | B2 | 8/2014 | Skrinde |
| 8,958,911 | B2 | 2/2015 | Wong et al. |
| 9,366,596 | B2 | 6/2016 | Mekid et al. |
| 9,383,055 | B2 | 7/2016 | Hirose et al. |
| 9,709,514 | B2 | 7/2017 | Edwards et al. |
| 9,726,569 | B2 | 8/2017 | Koyanagi |
| 10,378,992 | B2 | 8/2019 | Penza et al. |
| 10,380,423 | B2 | 8/2019 | Pittman et al. |
| 10,465,835 | B2 | 11/2019 | Wehlin et al. |
| 10,545,121 | B2 | 1/2020 | Frueh et al. |
| 10,783,623 | B2 | 9/2020 | Morris et al. |
| 10,914,417 | B2 | 2/2021 | Wehlin et al. |
| 10,929,968 | B2 | 2/2021 | Morris et al. |
| 11,118,719 | B1 | 9/2021 | Moreau et al. |
| 11,154,989 | B2 | 10/2021 | Wehlin et al. |
| 11,209,114 | B2 | 12/2021 | Polygerinos et al. |
| 11,232,391 | B1 | 1/2022 | Baalke et al. |
| 11,274,929 | B1 * | 3/2022 | Afrouzi ..................... G06T 7/30 |
| 11,348,269 | B1 | 5/2022 | Afrouzi et al. |
| 11,398,040 | B2 | 7/2022 | Asmari et al. |
| 11,435,192 | B1 | 9/2022 | Ebrahimi Afrouzi et al. |
| 11,587,217 | B2 | 2/2023 | Morris et al. |
| 11,656,082 | B1 | 5/2023 | Ebrahimi Afrouzi et al. |
| 11,732,832 | B2 | 8/2023 | Wehlin et al. |
| 11,754,514 | B2 | 9/2023 | Duerfeldt et al. |
| 11,826,916 | B2 | 11/2023 | Wehlin et al. |
| 11,887,291 | B2 | 1/2024 | Morris et al. |
| 11,947,362 | B1 | 4/2024 | Alnajjar et al. |
| 12,008,780 | B2 | 6/2024 | Asmari et al. |
| 12,123,537 | B2 | 10/2024 | DeKyspotter et al. |
| 12,449,385 | B2 | 10/2025 | Duerfeldt et al. |
| 2004/0099175 | A1 | 5/2004 | Perrot et al. |
| 2007/0051192 | A1 | 3/2007 | Penza et al. |
| 2009/0120215 | A1 | 5/2009 | Jacobson et al. |
| 2010/0191376 | A1 | 7/2010 | Close et al. |
| 2012/0173018 | A1 | 7/2012 | Allen et al. |
| 2012/0185094 | A1 | 7/2012 | Rosenstein et al. |
| 2013/0226344 | A1 | 8/2013 | Wong et al. |
| 2015/0073646 | A1 | 3/2015 | Rosenstein et al. |
| 2015/0120057 | A1 | 4/2015 | Wong et al. |
| 2018/0011064 | A1 | 1/2018 | Furr |
| 2018/0106697 | A1 | 4/2018 | Penza et al. |
| 2018/0313715 | A1 | 11/2018 | Cichosz et al. |
| 2019/0048707 | A1 * | 2/2019 | Benson ..................... E21B 7/04 |
| 2019/0079031 | A1 | 3/2019 | Safai et al. |
| 2019/0086020 | A1 | 3/2019 | Wehlin et al. |
| 2019/0120418 | A1 | 4/2019 | Sivacoe |
| 2019/0227528 | A1 * | 7/2019 | Abbott ................... G06N 20/00 |
| 2019/0322384 | A1 * | 10/2019 | Bosworth ............. B64U 30/20 |
| 2019/0323645 | A1 | 10/2019 | Polygerinos et al. |
| 2019/0323654 | A1 | 10/2019 | Rovekamp, Jr. |
| 2019/0360976 | A1 | 11/2019 | Frueh et al. |
| 2020/0088339 | A1 | 3/2020 | Wehlin et al. |
| 2020/0094413 | A1 | 3/2020 | Liu et al. |
| 2020/0111222 | A1 | 4/2020 | Asmari et al. |
| 2020/0175667 | A1 | 6/2020 | Morris et al. |
| 2020/0215692 | A1 | 7/2020 | Pivac et al. |
| 2020/0225673 | A1 | 7/2020 | Ebrahimi Afrouzi et al. |
| 2020/0269439 | A1 * | 8/2020 | Telleria .................. B25J 11/005 |
| 2021/0062954 | A1 * | 3/2021 | Du .......................... H04L 67/12 |
| 2021/0089040 | A1 | 3/2021 | Ebrahimi Afrouzi et al. |
| 2021/0094186 | A1 | 4/2021 | Wehlin et al. |
| 2021/0172557 | A1 | 6/2021 | Wehlin et al. |
| 2021/0402609 | A1 | 12/2021 | Wehlin et al. |
| 2022/0066456 | A1 | 3/2022 | Ebrahimi Afrouzi et al. |
| 2022/0341311 | A1 * | 10/2022 | Ramirez-Alcala ........................... B23Q 17/0961 |
| 2023/0010498 | A1 | 1/2023 | Asmari et al. |
| 2023/0050602 | A1 | 2/2023 | Duerfeldt et al. |
| 2023/0079054 | A1 * | 3/2023 | Mikhailov ........... G05B 19/406 700/108 |
| 2024/0025051 | A1 | 1/2024 | Wehlin et al. |
| 2024/0164605 | A1 | 5/2024 | Weyant et al. |
| 2024/0310851 | A1 | 9/2024 | Ebrahimi Afrouzi et al. |
| 2024/0324838 | A1 | 10/2024 | Ebrahimi Afrouzi |
| 2025/0128423 | A1 | 4/2025 | Goss et al. |
| 2025/0128437 | A1 | 4/2025 | Goss et al. |
| 2025/0129873 | A1 | 4/2025 | Goss et al. |
| 2025/0129874 | A1 | 4/2025 | Goss et al. |
| 2025/0129875 | A1 | 4/2025 | Goss et al. |
| 2025/0129876 | A1 | 4/2025 | Parker et al. |
| 2025/0129877 | A1 | 4/2025 | Parker et al. |
| 2025/0129878 | A1 | 4/2025 | Goss et al. |
| 2025/0130180 | A1 | 4/2025 | Parker et al. |
| 2025/0130571 | A1 | 4/2025 | Parker et al. |
| 2025/0130572 | A1 | 4/2025 | Parker et al. |
| 2025/0130575 | A1 | 4/2025 | Parker et al. |
| 2025/0130578 | A1 | 4/2025 | Goss et al. |
| 2025/0130591 | A1 | 4/2025 | Goss et al. |
| 2025/0131529 | A1 | 4/2025 | Parker et al. |
| 2025/0277555 | A1 | 9/2025 | Tan et al. |
| 2025/0347380 | A1 | 11/2025 | Goss et al. |

OTHER PUBLICATIONS

Office Action from U.S. Appl. No. 18/885,405 dated Dec. 23, 2025, 24 pp.
Final Office Action from U.S. Appl. No. 18/885,405 dated May 12, 2026, 30 pp.
Response to Office Action dated Dec. 23, 2025 from U.S. Appl. No. 18/885,405 filed Mar. 11, 1 2026, 12 pp.
Advisory Action from U.S. Appl. No. 18/885,405 dated Jul. 13, 2026, 3 pp.
Response to Final Office Action dated May 12, 2026 from U.S. Appl. No. 18/885,405, filed Jul. 6, 2026, 13 pp.
Response to Final Office Action dated May 12, 2026 from U.S. Appl. No. 18/885,405, filed Sep. 3, 2026, 10 pp.

* cited by examiner

SYSTEM AND METHOD FOR REALTIME FEEDBACK LOOP FOR MULTI-SENSOR APPLICATIONS

PRIORITY CLAIM AND RELATED APPLICATIONS

This application claims priority to provisional Application No. 65/571,263 filed Mar. 28, 2024, the entire contents of which are hereby incorporated by reference and is a continuation-in-part of U.S. patent application Ser. No. 18/492,662 filed Oct. 23, 2023, the entire contents of which are hereby incorporated by reference.

TECHNICAL FIELD

This disclosure is directed to systems and methods to use a robotic tool to execute processes in an enclosed or dangerous space.

BACKGROUND

To automate processes that are performed more efficiently, especially in those environments where operators cannot or should not be located within the environment, new systems and methods need to be developed. One such environment is in the water and sewer pipe infrastructure. During pipeline examination, precise identification of all pipeline characteristics and flaws is crucial. Conventional techniques depend on human intervention for detecting features and defects, leading to a process that is susceptible to errors and lacks efficiency. An automated detection method with a high degree of accuracy is essential to address this need.

Some existing mapping systems utilize a visual camera which rely on manual observation to detect features within the scanned environment. Other systems utilize infrared cameras to detect temperature variations within the scanned environment. However, there are no systems that are able to correlate this disjointed set of data.

However, the inability to create accurate digital maps is only one problem. The second problem is the lack of ability to accurately and efficiently perform an operation within the environment, for example, the cutting of a water or sewer pipe from within the pipe.

The concepts relating to pipeline examination and operational processes such as cutting are applicable across multiple industries and domains. For example, pipeline examination and remote operation processes are critical for water, sewer, gas, and oil pipelines. Likewise, examinations to detect features and defects in, or simply to map, other enclosed spaces, including sites that may contain hazardous chemicals or are not of sufficient size to allow human inspection, also would use the same or similar concepts. Moreover, accurate representations and operations in other environments would also benefit from the same or similar concepts, even not those environments in a closed space. As such, an automated detection system and method with a high degree of accuracy that can be adopted across multiple domains in a plurality of industries is needed to address the need for accurate inspections, along with the systems and methods to perform operational processes in such domains once such inspections have been completed.

SUMMARY

A summary of the disclosure is provided at the end of this specification to introduce a selection of concepts in a simplified form that are further described below in the Detailed Description. This summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

Reference will now be made to the accompanying drawings, which are not necessarily drawn to scale, wherein like reference numerals refer to like elements.

DETAILED DESCRIPTION OF ILLUSTRATIVE EMBODIMENT

Figure 1:
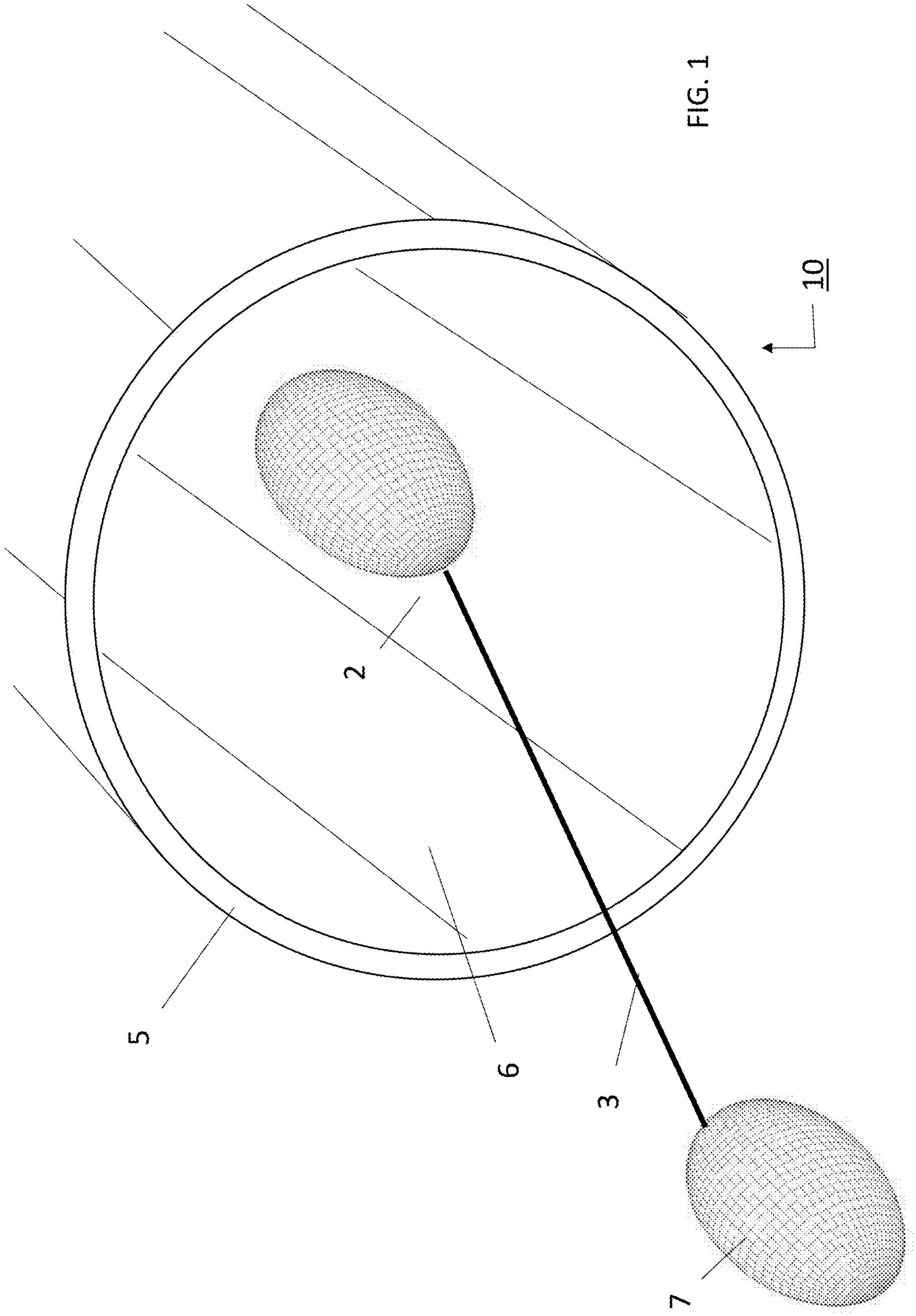
FIG. 1 is an exemplary illustration of one operating environment for the system and method of the present disclosure.

System Overview. This disclosure is directed to systems and methods for using mapped features of a three-dimensional environment using robotics and artificial intelligence to control the operational actions of a robot within the environment. The applications for the disclosure may include but are not limited to the mapping of enclosed or remote spaces, toxic areas, water and gas infrastructure, and other applications.

The disclosure includes the combination of multiple sensors, including but not limited to cameras, infrared recognizers (IR), Light Detection and Ranging (LIDAR), motion and other sensors integrated onto a robotics system, and fusing the data from those sensors in a sensor fusion system to create a coherent representation of the three-dimensional ("3D") environment. Artificial intelligence ("AI") models are trained using heuristics and statistical data analysis to predict and mark the locations of features to create digital twins of the environment. The systems and methods of the present disclosure enable the scanning of the environment to detect, label, and locate features in real time and to use that scan to augment the control of operations of the robot as it performs other functions.

The system comprises hardware and software. While the description herein will describe exemplary hardware functionality and software functionality, it will be understood that certain hardware functions may be provided in software and certain software functions may be implemented in hardware. It will also be understood that while certain functionality will be described as discrete components of an overall system, the scope of the present disclosure includes certain components that may be integrally connected to other components.

The hardware components include a plurality of sensors. Included may be visual and infrared cameras, spatial distance sensors, which may, for example, be LIDAR components, ultrasonic, stereoscopic vision, or other methods to create a three-dimensional point cloud. The visual camera may configured to provide two-dimensional and red/green/blue (RGB) color outputs and will be referred to as RGB cameras herein. Additionally, an inertial measurement unit (IMU) or other suitable sensing devices capable of capturing environmental data and motion data may be included as one or more of a plurality of sensors. IMUs may, for example, be multi-axial IMUs which are capable of measuring vibrations in certain configurations as is known in the art. Combinations of infrared cameras, RGB cameras, motors and encoders may also be utilized. Such sensors provide measurements such as distances, angles, 3D point-clouds, images, and features to facilitate the robot's spatial awareness and facilitate detection. The sensors may be strategically positioned on a robot to be deployed within the environment.

The software components include various algorithms and computational techniques for processing the sensor data and extracting meaningful information as set forth in more detail herein. These algorithms employ advanced techniques such as object detection, feature extraction, data association, odometry estimation, probabilistic modeling, and optimization methods.

While the system has multiple applications in a variety of fields of use the present disclosure will use a non-limiting embodiment in which there is a cutting tool controlled by a robot to reinstate the operational features of a pipeline following a re-lining process. For example, there may have been a cure in place pipe (CIPP) process which installs and cures a liner inside an original host pipe. After lining, the liner must be cut to re-establish fluid communication with the existing services so that the pipe system is operational again. Services are pipes or conduits that extend from the host or main pipe that allow fluid to flow to or from the host pipe. These may be variously referred to as "services," "branch conduits" and "laterals" in this description. While the disclosure will be described in terms of a cutting tool, this is exemplary only. Other tools, including drills, probes, sanders, and the like may be controlled by a robot to be applied in a variety of applications and on a variety of materials within an operating environment, including but not limited to wood, stone, metals, and plastics.

In an aspect, the disclosure includes a robot that will scan and digitally map a host pipe before the re-lining process, re-scan the host pipe after the re-lining process, and then use analytics based on multi-modal sensor reading to control a cutting tool to access services associated with the project. The disclosure includes using the digital maps during the cutting process to localize the robot within the pipeline and locate the services which need to be cut and then execute an automated cutting path to traverse the robot to the point of service.

During the scanning operation, or in post processing of the scan, the detection of all the observations will be marked within a digital map of the pipe. This will include labeling and unique enumeration for each observation, which is described within the scan frame of reference as discussed in more detail herein.

Various features are included in this disclosure, including but not limited to the autonomous cutting of a surface, the autonomous navigation of the robot to avoid obstacles, dynamically adjusting the cutting tool based on the material being cut, and providing a robust real-time user interfaces using immersive technology, such as virtual reality (VR) and/or augmented reality (AR), to permit an operator to control the cut as needed.

The systems and methods of the present disclosure improve the state of the art by creating a smooth feed rate of the cutting tool advancing against the material to be cut (e.g., a liner within a pipe) and optimal contour and safety around the edges of a service. Based upon additional training of the process based on feedback from the use, it is possible to recognize and adapt to the different materials that may react to the cutting process differently. Depending on the type of material (known ahead) and the thickness of the material (known ahead) as well as the curing parameters (known ahead), the relative hardness of the material (or resistance of the material to cutting) may be predictable as well is how the material will react to the cutting process.

In an embodiment, material hardness may be predicted in advance based on the respective properties of the host pipe and the liner material. For example, the host pipe may be constructed of brick, clay, concrete, asbestos, metal, or any other type of material used to transport water or wastewater. Each of such materials may be represented in a drop-down menu or may be entered as inputs to a rules-based algorithm or look-up table to determine an initial hardness of the host material.

Likewise, the liner material and curing method may be selected from a predetermined list as set forth above. Liner materials may, for example, include carbon fiber reinforced polymer (CFRP); reinforced glass fiber cured using ultraviolet rays, polyester urethane or any other suitable liner material.

Ambient conditions, including temperature, pressure and humidity may also be determined and used to calculate the predicted material hardness. The thickness of the pipe and the liner material may also be variables to be considered in predicting the material hardness.

To the extent that the type of host or liner material, or the properties associated therewith, is not preprogramed as part of the set-up of the system, characteristics of the host or liner material may be input to an AI/ML learning algorithm to determine an initial hardness of the host material. Likewise, measurements of hardness calculated by the cutting process may be used to update tables or machine learning algorithms to make the advance prediction of material hardness more accurate.

Predicting the material hardness in advance permits the adjustment of the feed rate, also referred to herein as the cutting speed, to prevent the cutting tool from overheating and to maximize the probability of a smooth cut. If the prediction is that the material may be softer than anticipated, the cut may be made further from the edge and a finishing brush may be applied to provide a smooth edge.

Additionally, different operating environments may place different constraints on the desired outcome of the cut. In an aspect, a single large chip/swarf/coupon, also referred to herein as the removed material, may be advantageous. In such a case, a cut path would be defined that optimizes a path around the largest safe exterior path, so that there is only a single outline of the entire contour. In an aspect, the removed material may be ground into small bits. In such a case, the cut path may be an outward spiral or a zig-zag path. That permits the cutting bit to overlap with the desired amount of material to turn the removed material into a fine dust. The opening will gradually get large and larger, as there would be no single large cutting path.

So given the different parameters that were either predetermined or calculated regarding the liner, real time adjustments to the cutting path may be made. Such parameters may be fed into one of the algorithms to convert the parameters into the mechanical motion of the cutting tool.

These algorithms employ advanced techniques such as object detection, feature extraction, data association, odometry estimation, probabilistic modeling, and optimization methods Algorithmic approaches include interpolation, A*/Dyskstra's methods, optimization control, and other machine learning algorithms.

It will be understood that this disclosure may use cutting operations within a pipe environment as an example in this detailed description, but the systems and methods disclosed herein are applicable across a broader range of applications.

In an aspect, the cutting tool may be a drill having one or more bits, each with a different size and shape and selected based on their intended use. In an aspect, other tools may include a rotary disk, saw, router, or any other mechanical cutting tool that can be adapted to the cutting environment and the material to be cut. There may be some sensors in the cutting tool, such as motor RPM sensors, as well as voltage and current sensors. Other sensors described herein may be associated with the robot. Communications between the two may be through API's or direct interfaces. Also, functionality between a cutting tool and a robot as defined herein is exemplary and some sensors from the cutting tool may be associated with the robot and vice-versa. Additionally, the robot and the cutting tool may be separate and connected to each other through mechanical and electrical connections or may be integrally produced to be a single unit.

Operating Environment. FIG. 1 is an exemplary view of one of several different operating environments of the present disclosure. In this non-limiting example, the operating environment 10 is an enclosed pipe 5 having interior 6. A robot 2 attached to a tether 3 is disposed within the interior 6. As discussed in greater detail below, robot 2 includes multiple sensors whose data sets are fused together by a controller o in a sensor fusion system. Unless otherwise set forth explicitly herein, controller, processor and sensor fusion system are used interchangeably. Through a series of iterative processes, the robotic system 10 combines one or more sensor measurements and estimates the presence of and position/orientation of the features within the scanning environment and records data that is processed with on-board processors to map the interior condition of the pipe 5 in real time, or near real time, and to then convey those conditions to a truck 7 connected to the other end of a tether 3. For example, the robot 2 and the truck 7 may communicate across the tether 3 using Ethernet protocol. The truck 7 may be connected to a server (not shown) or a cloud computing platform for further computing and/or storage.

The tether 3 may span the length of the environment with additional length to traverse from side to side. In an aspect, the environment may be a fifty-foot pipe and the tether may be 100 feet long. While the implementation will be described with respect to tether 3, it will be understood that the on-board processors may communicate with an outside processor via near field communications such as Wi-Fi, Bluetooth®, or other types of wireless communications, including local area networks and/or wide area networks. Tether 3 may also include an encoder configured to measure distance traveled by the robot 2 through the environment 10.

In an embodiment, the robot 2 may have multiple sensors, including, but not limited to, RGB color sensors, infrared sensors, LIDAR sensors, motion sensors, and other sensors. For example, there may be one or more visual cameras to collect still or motion video data, one or more infrared cameras to collection infrared data, one or more inertial measurement unit ("IMU") sensors to collect pose and position data, one or more motor encoders for sensing and collecting position data, one or more LIDAR sensors or cameras for generating 3D point cloud data, and other motion and/or application specific sensors.

Figure 2:
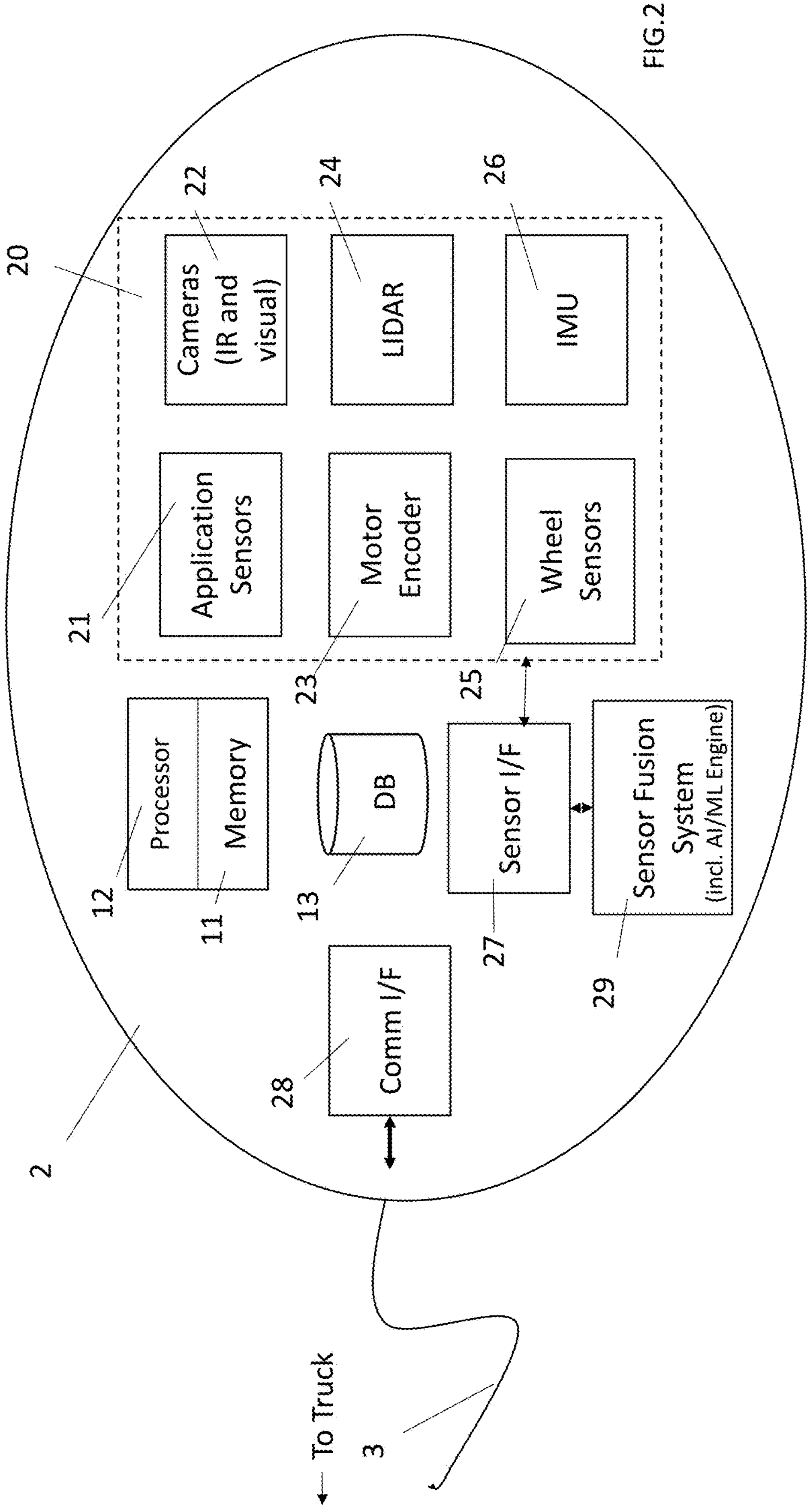
FIG. 2 is an exemplary schematic diagram of a robot having a processor and multiple sensors configured to practice the system and method of the present disclosure.

With reference to FIG. 2, there is shown an exemplary robotic system 2 having multiple sensors contained therein. While the exemplary system of FIG. 2 is shown with a plurality of discrete sensors shown collectively as sensors 20 integral to robot 2, it will be understood that the sensors in accordance with the present disclosure may include on-board sensors, attached sensors, or remote sensors. The sensors may be affixed to an arm extending from the body of the robotic system 2.

Among the exemplary sensors shown in FIG. 2, there are shown LIDAR sensors 24, IMU sensors 26, wheel sensors 25, motor encoder sensors 23, cameras (both infrared and visual) 22, and application specific sensors 21. Each of these will be described in greater detail below.

Also shown is a sensor interface 27 which may, for example, be communicatively coupled, directly or indirectly, to each of the sensors 20. The sensor interface 27 may receive raw sensor data from each of the sensors 20 and store the raw sensor data in database 13. The sensor interface 27 may be connected to a sensor fusion system 29 which may, for example, comprise one or more software programs operating on the processor 12. The sensor fusion system 29 may analyze the sensor data from one or more sensors 20 and/or control the operation of the one or more sensors 20. The sensor interface 27 may also convert the raw sensor data received from each of the sensors 20 into a format for further processing by the sensor fusion system 29. The sensor fusion system 29 may include an AI/ML engine. In one example, raw infrared data from an infrared scanner of the sensors 20 can be compared with data from an initial scan of the host pipe prior to lining. The sensor fusion system 29 fuses (broadly, "compares") this infrared sensor data and the initial scan data to predict the location and shape of a service opening in the host pipe that is covered by liner. The sensor interface 27 may also include a bi-directional communication path to sensors 20 to provide control and commands to the sensors 20 from the sensor fusion system 29. For example, the sensor fusion system running on processor 12 may process data received from a visual camera 22 through sensor interface 27 and then issue a command to the visual camera 22 to change its focal point or orientation to create additional camera inputs for processing. Other command and control functions from the processor to the sensors are contemplated by the present disclosure.

The sensors 20 may be calibrated from time to time. Factory calibration may occur at the time of manufacture or re-calibrated to factory settings at the time of deployment. Additionally, field calibration may also be performed. For example, the processor 12 may use known historical data in the database 13 to recalibrate one or more sensors 20 in the field. So, if, for example, there is a disparity between a motor encoder sensor 23 reading and an IMU sensor 26 reading due to slippage, either or both of those sensors may be recalibrated to harmonize the readings. It will be noted that re-calibration may occur periodically via a preset schedule and/or a timer or aperiodically via a command.

Also shown in FIG. 2 is a communication interface 28. The communication interface 28 may be a wired or wireless communication interface that provides bi-directional communication to an external computer network or server (not shown). For wired communication, the communication interface 28 may include logic for communicating through tether 3 of FIG. 1. In an aspect, the communication interface 28 may communicate with truck 7 of FIG. 1 using Ethernet protocols. For wireless communications, the communication interface 28 may include one or more wireless communications functions and protocols, including cellular, which may be 5G cellular, wide area network protocols, local area network protocols, near field communication functionality and protocols, Wi-Fi, and/or Bluetooth functionality.

The robot 2 may include a processor 12 and memory 11 combination that may work in tandem in which the memory 11 stores instructions which, when executed by the processor 12, perform the functions described herein. The processor 12 may include an AI/ML engine. Such functions may include the command and control of the sensors 20. Such functions may also include the processing in real time, or near real time, of sensor data collected by the various sensors 20. In an aspect, there may be one or more central processing units (CPUs). Additionally, there may be a combination of one or more CPUs and one or more graphics processor units (GPUs). For example, while it is desirable to do most calculations on the robot to reduce latency, certain calculations may not be needed as quickly and can be shunted to the truck 7 or the cloud. This would improve the efficiency of the onboard processor. The processor 12 may, for example, be a Nvidia® Jetson Xavier NX processor(s). However, the disclosure and associated claims shall not be limited to any particular configuration of processors.

The on-board processing of sensor data may provide for low latency of sensor data processing. For real-time or near real-time processing, the processor 12 may include a direct interface to the sensor interface 27. For other functions, the processor 12 may include a direct interface to the database 13 and perform operations on stored data. Such stored data may include, for example, historical sensor data used for calibration or continued training of artificial intelligence/machine learning algorithms.

In an embodiment, the sensor fusion system 29 may perform iterative processes to combine sensor data from multiple types of sensors 20 to develop estimates of the position and orientation of the robot 2 within the scanning environment and may store that in the database 13. A mapping of the environment, including, for example, the interior 6 of the pipe 5 of FIG. 1, and the detection of objects in the environment may be performed by the processor 12 using sensor data collected from multiple sensors 20. The map may include objects, services, features, landmarks and/or other relevant information, which may vary based on the particular application of the technology. As the robot 2 moves through the environment, the various sensor readings may be aggregated to build a virtualized 3D representations of the scanned locations to perform mapping, feature recognition, and other functionality.

Figure 3:
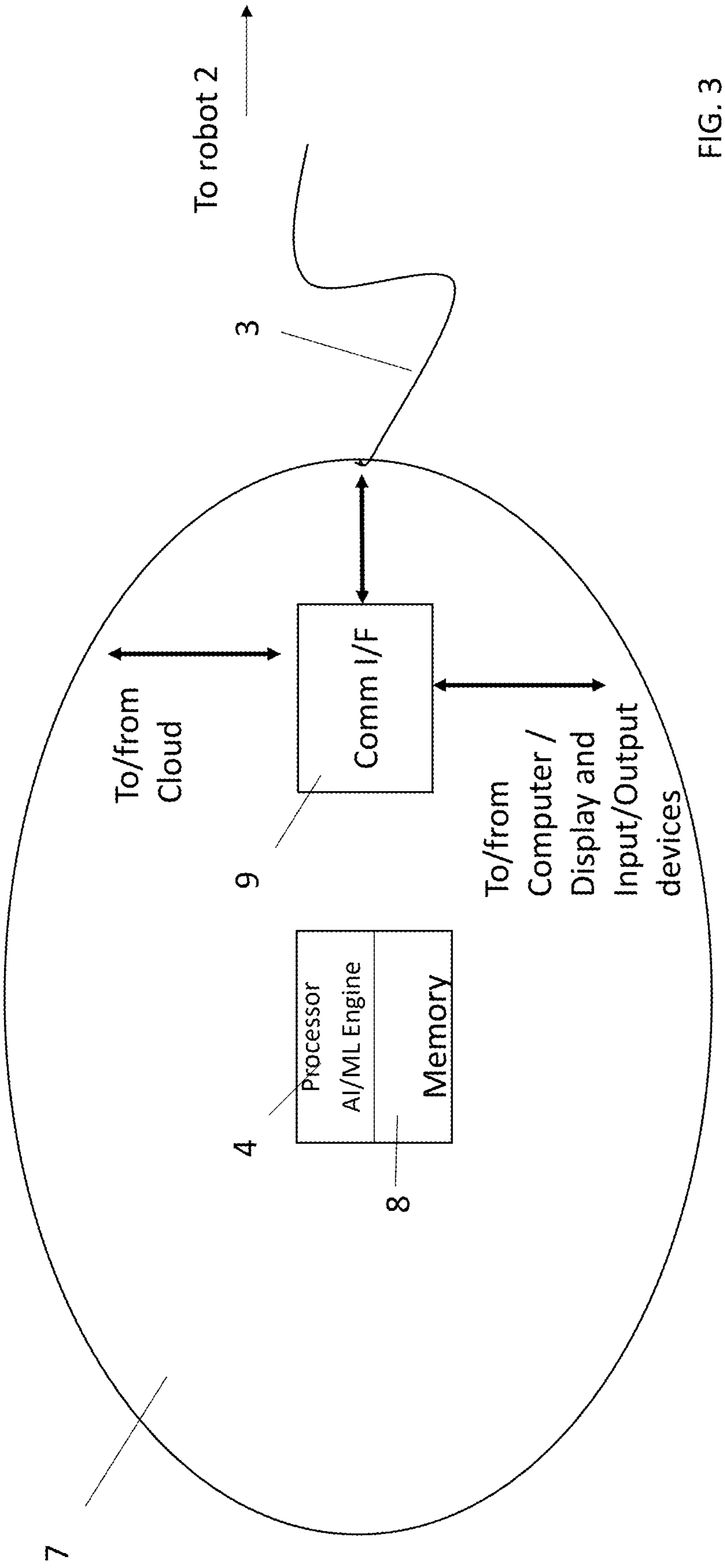
FIG. 3 is an exemplary schematic diagram of a truck tethered to robot having an on-board processor.

In an embodiment, the robot 2 may be connected via the tether 3 to the truck 7 of FIG. 1. With reference to FIG. 3, the truck 7 may sit outside or at an opening to the pipe 5 of FIG. 1. The truck 7 may be stationary relative to the robot 2 and the pipe 5. The truck 7 may include a communication interface 9 which enables communication with robot 2 through communications interface 28. In an aspect, the protocol between communication interface 9 and communication interface 28 may be Ethernet or any other suitable wired and/or wireless communication protocol. Another protocol may include a controller area network (CAN). It will be understood that the communication may be wireless, wired, or both depending on the application. The communication interface 9 may also include communication functionality to and from a cloud computing platform (not shown) and to/from a display and/or other input means such as a keyboard, touchscreen, of voice processor (not shown).

Also shown in FIG. 3 are a processor 4 and memory 8 combination that may work in tandem in which the memory 8 stores instructions which, when executed by the processor 4, perform the functions described herein. The processor 4 may include an AI/ML engine. Such functions may include processing of sensor data provided by the robot 2. The processor 4 may, for example, be a Nvidia® processor(s) such as Jetson Xavier NX. Both the processor 12 and the processor 4 may operate in tandem and/or in parallel to process sensor data. As a design choice, the processor 12 may be assigned the processing of certain functions while the processor 4 is assigned the processing of other functions. Alternatively, or additionally, each processor may be assigned similar processing or all processing may be performed in either the processor 12 or the processor 4. The disclosure and associated claims shall not be limited to any particular configuration of processors or division of functionality between the processors. Likewise, each processor may consist of one or more GPUs and/or one or more CPUs.

Figure 4:
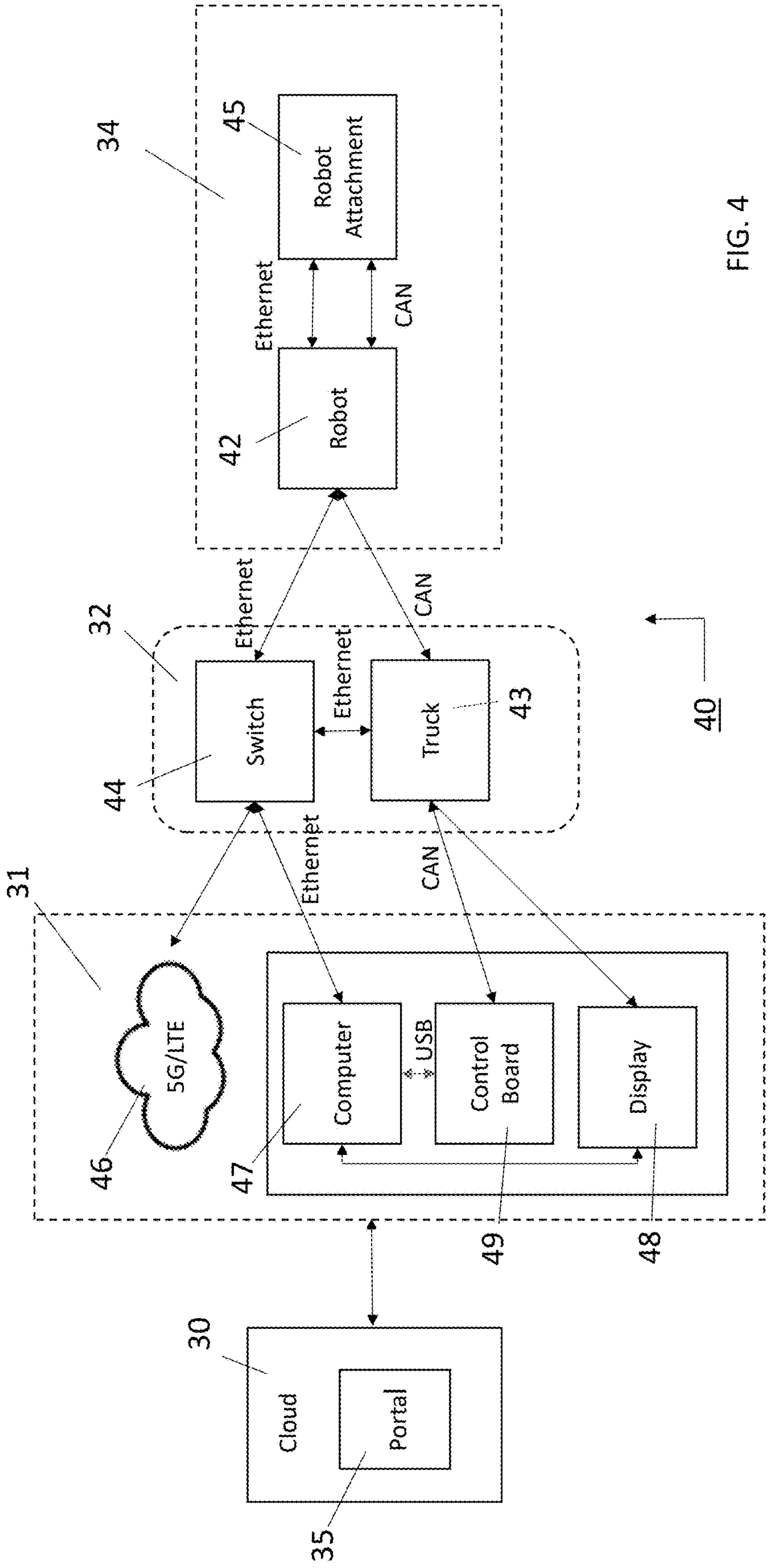
FIG. 4 is an exemplary hardware configuration constructed in accordance with the present disclosure.

With reference to FIG. 4 there is shown an exemplary system configuration of the present disclosure. Four components are shown, a robotic apparatus 34 configured to traverse an environment, which may, for example, be the interior of a pipe or other enclosed area, truck housing 32 in communication with the robotic apparatus 34, a controlling computer configuration 31 which may, for example, be located on site or may, in some configurations, be located remotely, and a cloud storage and processing facility 30 having a portal 35. With respect to the robotic apparatus 34, there is shown a robot 42 which may, for example, include some or all of the functionality of robot 2 shown in FIGS. 1 and 2. Robot 42 may be connected to robot attachment 45 and in communication with robot attachment 45 through an Ethernet connection and/or a controller area network (CAN) bus or any other communication interface. In an aspect, Power Line Communication (PLC) protocol may be used for communication between robot 42 and the 43 truck. Robot attachment 45 may be physically attached to the robot 42 or may be integral to robot 42. Robot attachment 45 may, in some configurations, not be physically attached to robot 42 but controlled remotely and communicatively by robot 42. Robot attachment 45, may for example, be a cutting tool as described in more detail herein. It will be understood that in addition to supporting an operator display station, computer configuration 31 may also provide additional or alternative AI/ML engine functionality.

The robot 42 may communicate with truck 43 which may, for example, include some or all of the functionality of truck 7 described above. The truck 43 may communicate with robot 42 using a physical bus, such as a CAN interface. Truck housing 32 may also include a switch 44 connected to the robot via Ethernet. The switch 44 and truck 43 may communicate through an Ethernet connection. In an embodiment, truck housing 32 may be located externally and/or adjacent to an environment of interest such as outside a pipe or other enclosed area being operated on by robot 42.

The controlling computer configuration 31 may, for example, be a personal computer having a processing computer 47, a display 48, and a custom control board 49. The in communication with the elements comprising truck housing 32. The computer 47 and display 48 configuration are standard and known in the art. The custom control board 49 may be attached to computer 47 through a USB connection, although other communications and connection protocols may be used.

Truck 43 may communicate with a control board 49 though a CAN interface. The truck 43 may also communicate with a display 48. The switch 44 may communicate to the computer 47 using Ethernet and may include a communications interface to a wireless network 46 such as 5G and/or LTE interface. As illustrated in FIG. 4, the Ethernet connection may be continuous and/or switched from the robot attachment 45 back to the computer 47 and include the robot 42, switch 44, and truck 43.

It will be noted that the communications and connection protocols listed above and as shown in FIG. 4 are exemplary only and other protocols and connections may be used.

Figure 5:
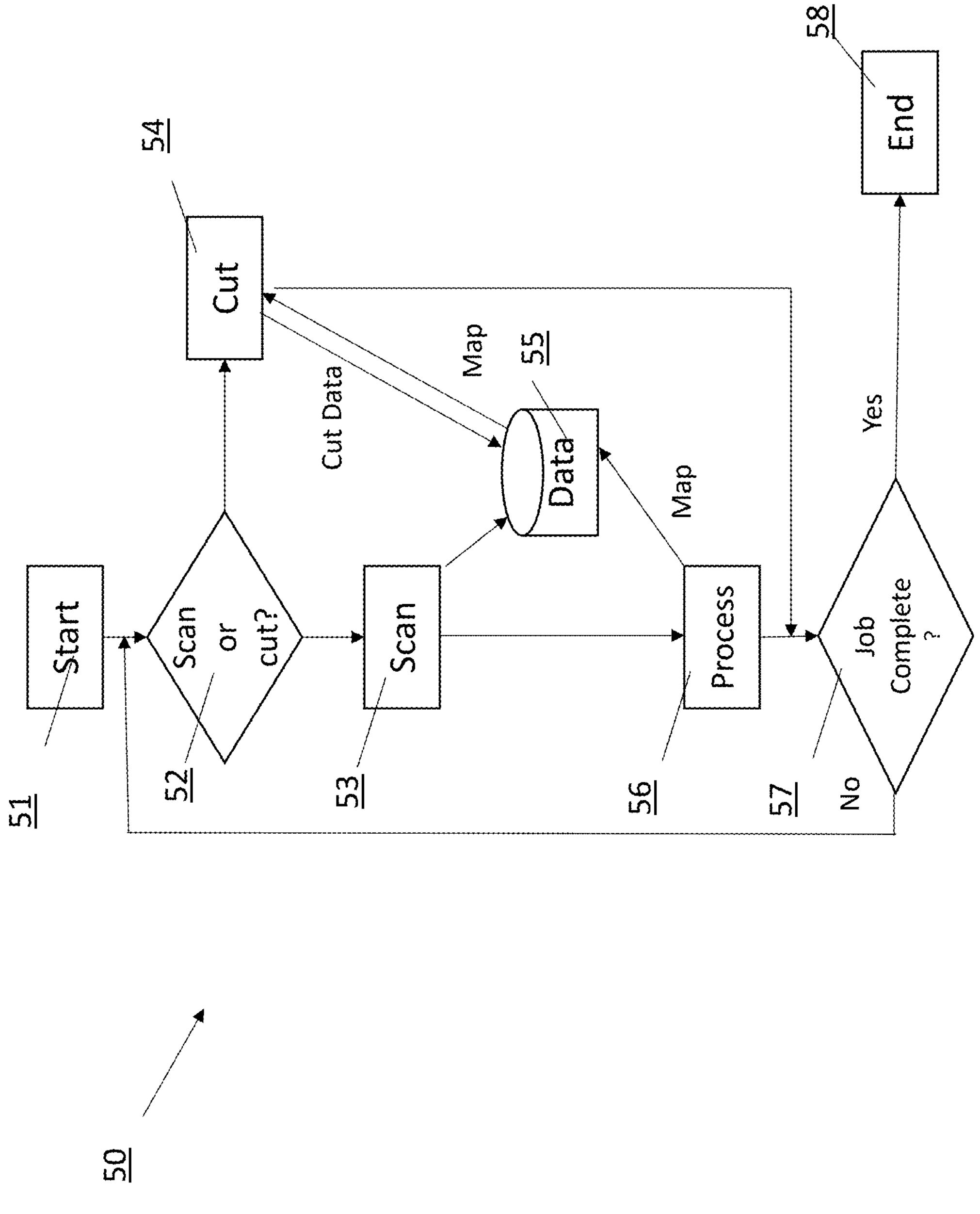
FIG. 5 is an exemplary flow diagram of the control for a scanning and/or cutting operation in accordance with the present disclosure.

Scanning Operations. With reference to FIG. 5, there is shown a high-level exemplary flow diagram 50 of the process for scanning and/or cutting a pipe within an environment. The process starts at 51 with the decision of scanning or cutting made at 52. If the process is scan, the scan occurs at 53 with raw and processed sensor data stored at data base 55. The scan process continues at 56 with the scanned mapping data stored in data base 55. At 57, the determination is made as to whether the job is complete. If the process is complete, for example, only a scan operation is being performed, then the process flow is complete at 58.

If at 57 the job is not complete, the process loops back to 52 where it is determined whether the scan should continue down the scan path 53 or whether a cut operation should be performed at 54. If the cut is to be performed, previously scanned map data stored in data base 55 is communicated to the cut process 54 and the raw and processed cut data is communicated to and stored in data base 55. The process then continues at 57 to determine whether the job is complete and to be ended at 58 or if the loop continues at 52.

Figure 6:
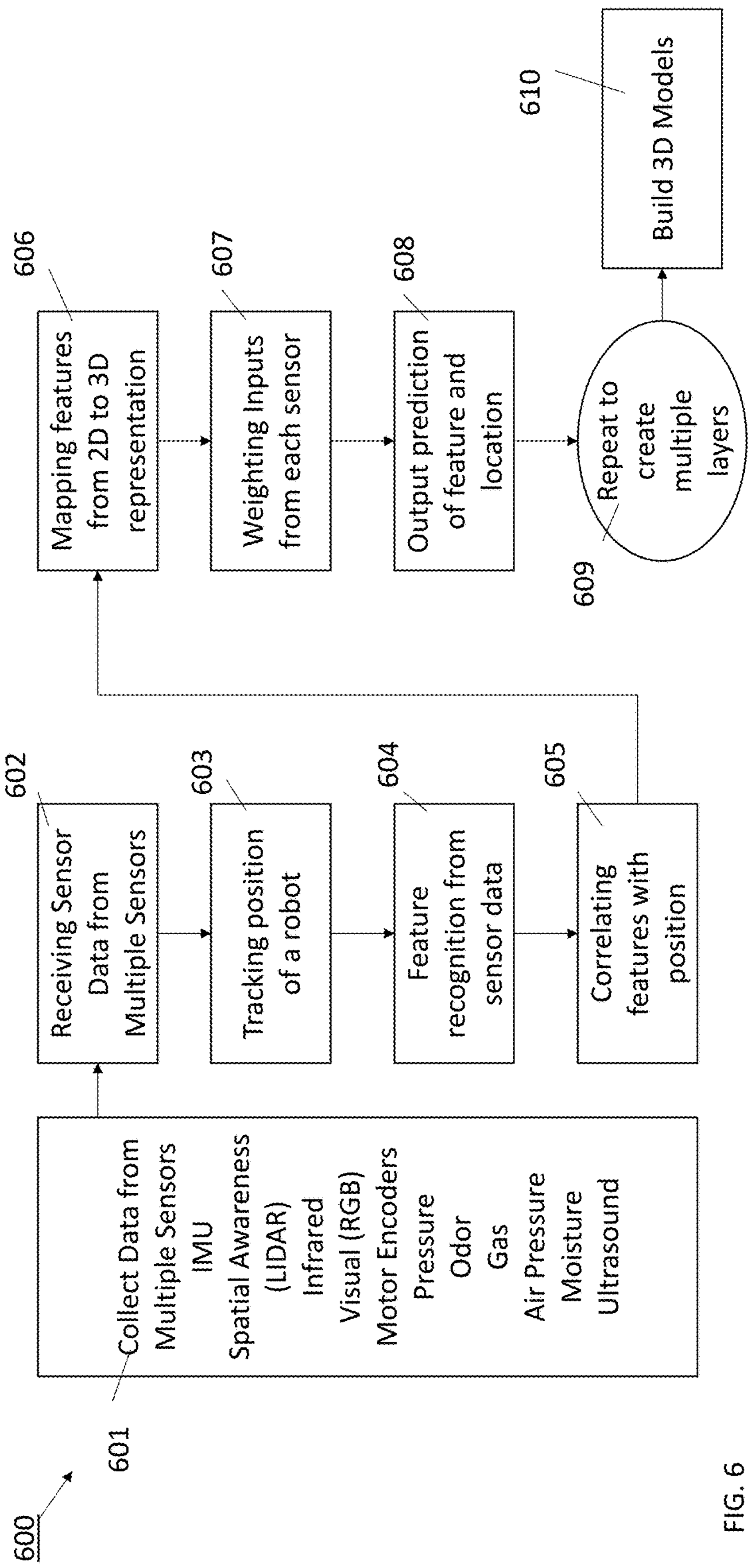
FIG. 6 is an exemplary flow diagram showing the process for building 3-dimensional models of a scanned environment using a multi-sensor configuration.

With reference to FIG. 6, there is shown an exemplary process 600 to create a 3-dimensional image during a scan operation. At 601, data from multiple sensors is captured. For example, the multiple sensor data may include IMU sensor data, LIDAR sensor data, IR and visual RGB sensor data, motor encoder data, pressure data, odor data, gas data, air pressure data, moisture data and ultrasound data. At 602, the sensor data is received by a processor. At 603, the position of a robot performing the scan is tracked. At 604, AI algorithms perform feature recognition using some or all of the sensor data. At 605, the features are correlated with the position of the robot. At 606, 2-dimensional features are mapped to a 3-dimensional representation of the features. At 607, the various sensor inputs may be weighted. At 608, an output is provided to predict the features and the location of the features. At 609, the process may be repeated to create multiple layers that ultimately comprise 3-dimensional models at 610, Using the plurality of sensors operating in the environment described above, one or more robots may perform scanning operations within the environment to create a digital image of the environment while moving through the environment. If the environment is a closed environment such as the interior of a pipe, the scanning operation may take place by a robot traversing within the pipe. During the scanning operation, or in post processing of the scan, the detection of all the observations will be marked within the map of the pipe. This will include labeling and unique enumeration for each observation, which is described within a scan frame of reference as described below.

Figure 7A:
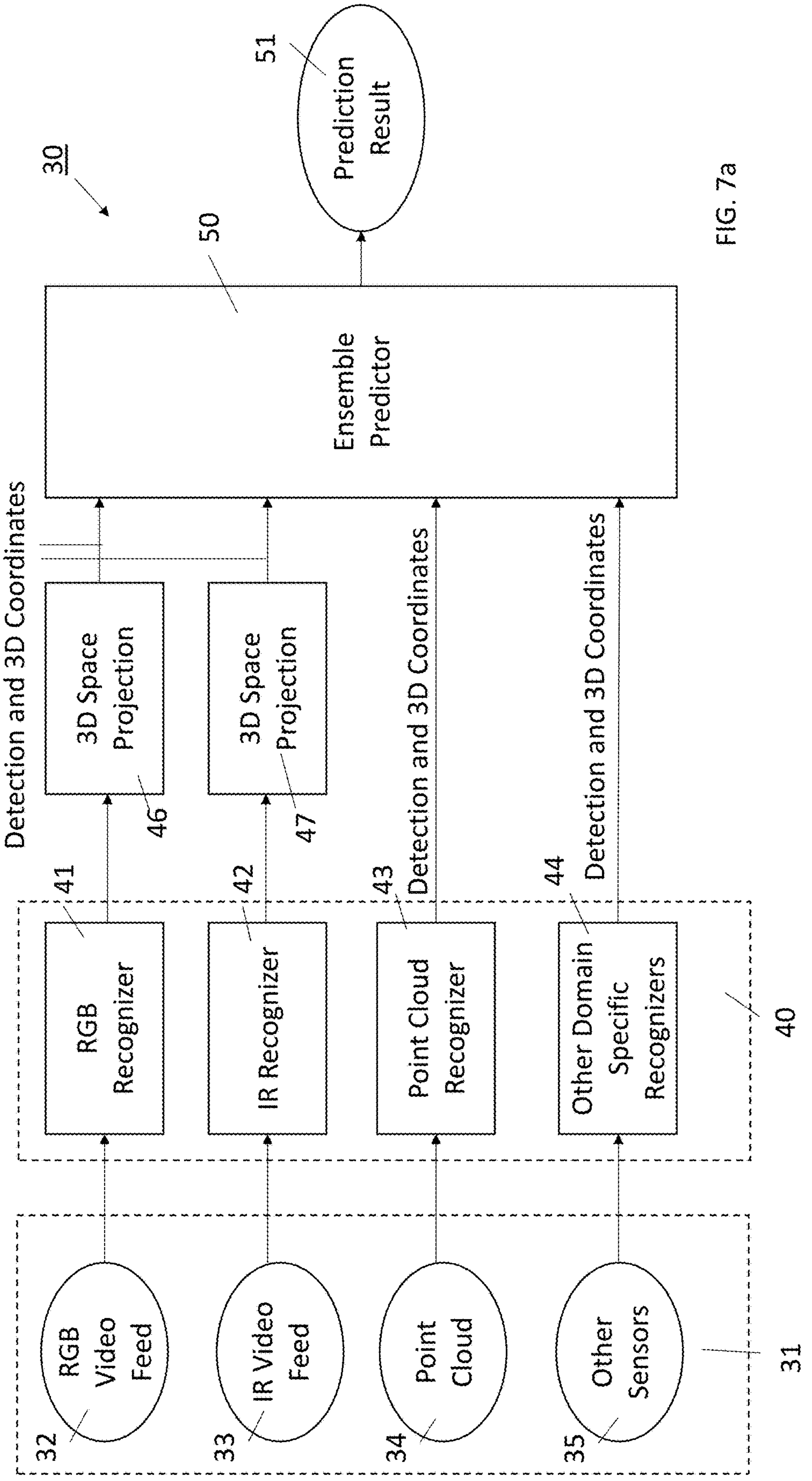
FIG. 7*a* is an exemplary flow chart of the algorithms which may be deployed for practicing the methods of the present disclosure.

Methods of Operation. FIG. 7 shows an exemplary flow chart using deep learning-based feature recognizers to process the sensor data coming from multiple sensors 20. By acquiring and using training data across multiple sensors, various sensor data may be embedded to produce one feature vector that represents multiple data relating to the feature detected. In an embodiment, RBG sensor data, point cloud data, IR and visual camera data, IMU data, and application domain specific sensors may be embedded in a single space to produce a feature vector that represents the pipe (or other environment) features. Using the feature embedding and the historical training data collected from the sensors 20, a deep neural network model may be created to automatically map and detect pipeline features in real time.

Shown in FIG. 7 are a plurality of exemplary sensor outputs 31, including RGB video feeds 32, IR video feed 33, point cloud data 34, and other sensor data outputs 35, which may, for example, include any of the sensors described above or be domain specific sensor outputs. Each of the sensor outputs 31 may be proceeded by one or more corresponding recognizers 40, including an RGB recognizer 41 associated with the RGB video feed 32, an IR recognizer 42 associated with IR video feed 33, a point cloud recognizer 43 associated with point cloud data 34, and other domain specific recognizers 44 associated with other sensor data 35. The recognizers 40 are described in greater detail below.

Continuing with the description relating to the flow diagram of FIG. 7, the outputs of the RGB recognizer 41 and the IR recognizer 42 are projected into a 3D spatial representation 46 and 47, respectively. The outputs of the 3D space projections, along with the outputs of the point cloud recognizer 43 and the other domain specific recognizers 44, include detection of features and associated 3D coordinates of associated with those features. The features and their respective coordinates are then sent to the ensemble predictor 50 which combines and weights the features and coordinates to produce a vector prediction result 51. The ensemble predictor is also described in more detail below.

It will be understood that the flow diagram in FIG. 7 is exemplary only and is simplified for the purposes of clarity. FIG. 7 is not intended to limit the disclosure to only such data processing flows. For example, the sensor data is not limited to that shown in FIG. 3, and multiple sensors may be input into one or more recognizers. Likewise, the identification of the recognizers in FIG. 7 is non-limiting and the recognizers deployed in accordance with the disclosure may include some of all of the recognizers shown in FIG. 7 as well as additional recognizers not shown in FIG. 7. The disclosure and the scope of the claims shall not be limited to only what is shown with respect to FIG. 7.

RGB Recognizer. The RGB recognizer 41 functionality may be designed to receive 2D RGB sensor data from a video camera feed and produce bounding boxes and 2D coordinates of the features and defects within the operating environment. In an embodiment, a deep learning model using pipeline inspection video frames may be used to detect features and defects based on the RGB video feed. The deep learning model may be trained using historical data from the same or similar environments. In accordance with the present disclosure, the performance of the deep learning module and the rate of receipt of the RGB video feed is such that the algorithm is able to produce object detection results in real time at thirty (30) frames per second. An example of the output of the RGB recognizer 41, namely a 3D space projection 46, is shown in FIG. 8.

Figure 8:
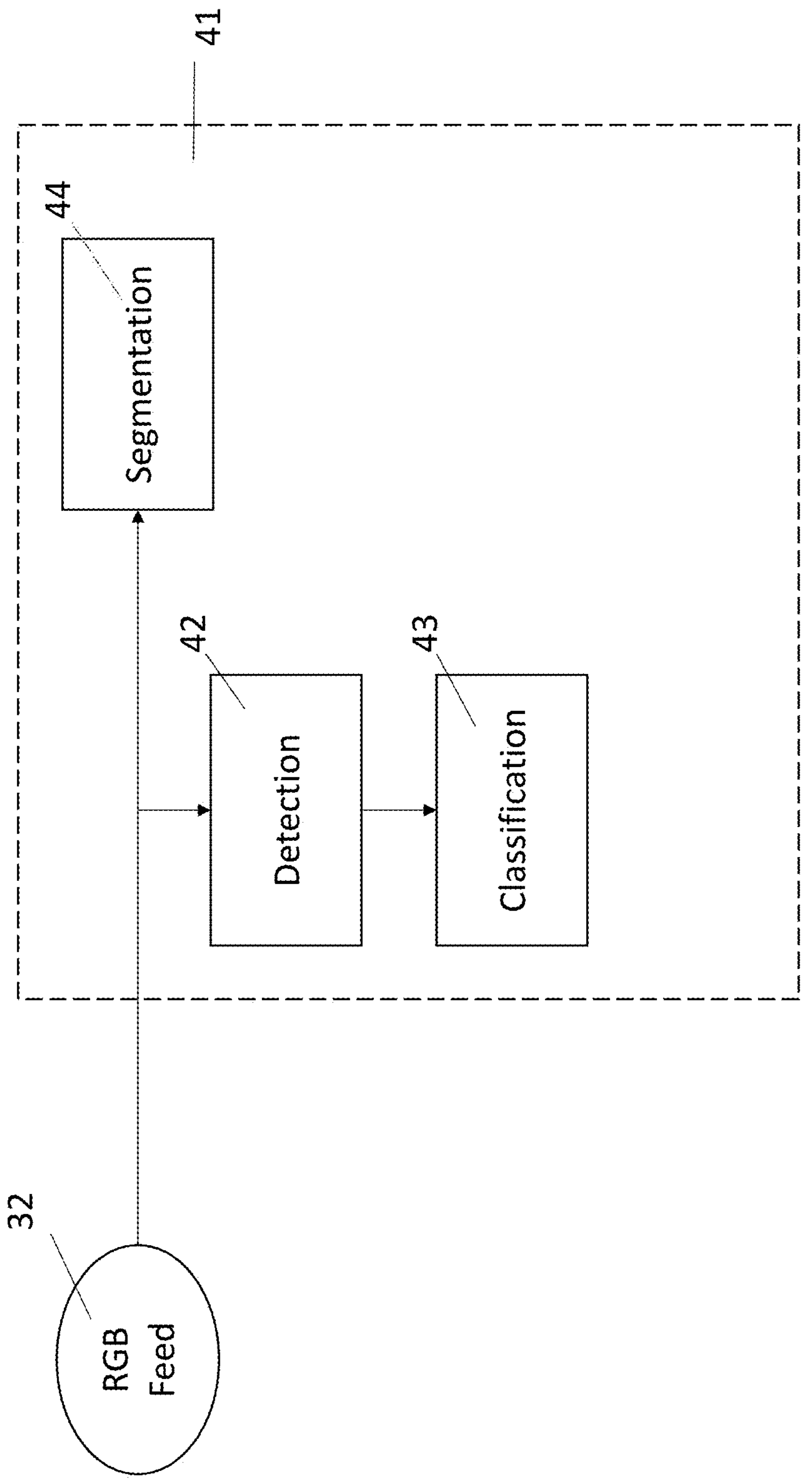
FIG. 8 is an exemplary flow chart for the processing in an RGB recognizer.

The RGB recognizer 41 functionality is shown in more detail in FIG. 8. The RGB recognizer 41 may, for example utilize a YOLO algorithm, a form of a convolutional neural network (CNN), to detect features. In an aspect, YOLO v. 8 may be used. For example, the RGB feed 32 may be input to a detection function 42. The detection function 42 may detect various features of a RGB data received from the RGB feed 32. For example, image pixels, or corresponding representations of the image pixels, received from the RGB feed 32 may be analyzed to determine a feature is located in a given pixel. The analysis may include comparing the pixel to neighboring pixels, identifying color counts (e.g., R value, G value, B value) of a pixel, determining a brightness value for the pixel, and the like. The results of the detection function 42 may then be passed to the classification function 43. The classification function 43 may, for example, determine one of five categories into which the detected feature may be found. In some cases, the classification function 43 may map the determined classification category into one of 3 subcategories.

Image segmentation 44 may, for example, be based on color or contrast. In a deep learning model, a neural network may be used to extract features using an encoding algorithm, then decoding those features corresponding to the input feed 41, and long-range neural network connections to produce scale and increase accuracy. Convolution layers may be used to encode each digital feature which may, for example, capture edges to produce feature vectors. While CNNs may be used, other types of deep learning neural networks may also be utilized. In some cases, the image segmentation 44 may occur in parallel to the operations of the detection function 42 and the classification function 43.

In an aspect, the recognizer 41 may determine an appropriate Pipeline Assessment & Certification Program ("PACP") codes developed by Nassco. Such PACP codes are known in the industry and may indicate factures, cracks, deformed, or collapsed pipes, among other features within a pipe system.

Infrared Recognizer. The infrared recognizer functionality may be designed to receive 2D IR sensor data and produce bounding boxes and 2D coordinates of the features and defects within the operating environment. The IR video feeds from one or more cameras 22 may be used by a deep learning model to detect features and defects within the environment. The deep learning model may be trained using historical IR video imagery from the same or a similar environment. An example of the output of the IR recognizer 42 is shown as 3D space projection 47 in FIG. 7.

Figure 9:
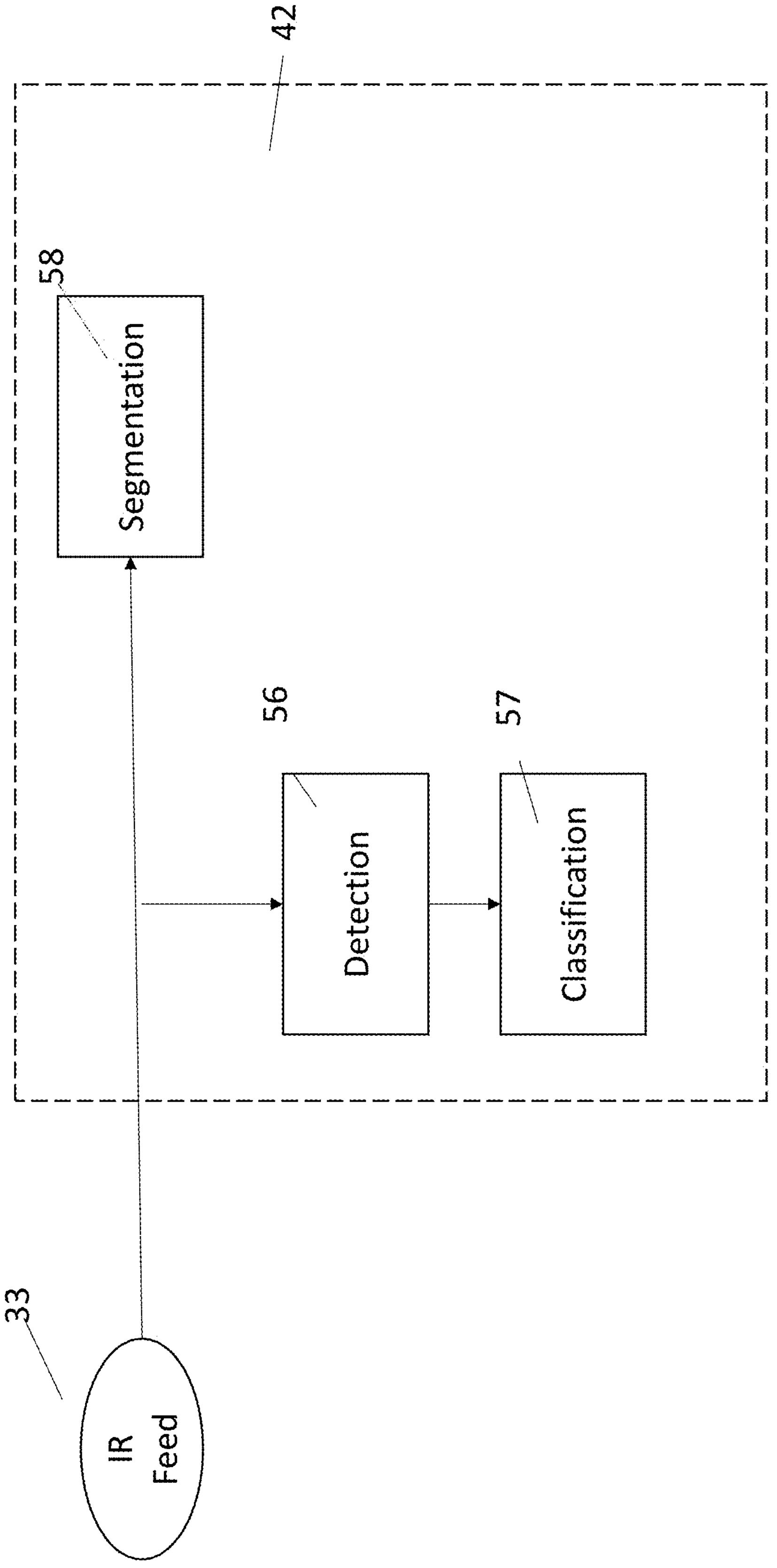
FIG. 9 is an exemplary flow chart for the processing in an IR recognizer.

The infrared recognizer 42 may operate on the same principles and in accordance with the same exemplary process as the RGB recognizer 41 as shown in FIG. 9. The IR recognizer 42 may, for example, utilize a YOLO algorithm to detect features. YOLO v. 8 may be used. For example, the IR feed 33 may be input to a detection function 56, which may detect various features contained in the IR data. The classification function 57 may, for example, determine one of five categories for classifying the detected feature. The classification function may also determine a subcategory for the detected feature (e.g., 1 of 3 subcategories). After identification of the subcategory, the process may continue at the segmentation function 58. Image segmentation 58 may, for example, in this case be based on temperature gradients which then may be color-coded. Alternatively, or in addition, machine learning may be used to set temperature ranges in which the most useful data may be acquired. For example, the temperature data may be segregated into ranges representing the coldest and hottest expected temperature readings. This segmentation may be useful in identifying the boundaries between hot and cold areas that is useful in detecting the location of a lateral opening into the host pipe. For example, the IR recognizer may be controlled to ignore infrared data from the IR feed 33 that falls outside of a high end temperature range and/or a low end temperature range. The high end and low end temperature ranges may be computed by the controller or set by a human operator. Among the considerations in setting the temperature ranges may include the known thermal information regarding the environment of the host pipe, curing temperature information, etc. Moreover, it will be understood that a temperature "range" may be bounded at two ends, or may have only a single boundary, such as temperatures greater than a certain set value or less than a certain set value. In a deep learning model, a convolution neural network may be used to extract features using an encoding algorithm, then decoding those features corresponding to the input feed 41, and long-range neural network connections to produce scale and increase accuracy. Convolution layers may be used to encode each digital feature which may, for example, capture edges to produce feature vectors. While CNNs may be used, other types of deep learning neural networks may also be utilized. In some cases, the image segmentation 58 may occur in parallel to the operations of the detection function 56 and the classification function 57.

The infrared recognizer 42 may detect features that are not present within a pipe but may be obscured behind a barrier. Moreover, the infrared recognizer may detect features that an RGB recognizer 41 is not able to do. For example, water collecting behind a pipe may be detected by an infrared recognizer 42 and not an RGB recognizer 41.

Alternatively or in addition, machine learning may be used to set temperature ranges in which the most useful data may be acquired. For example, the temperature data may be segregated into ranges representing the coldest and hottest expected temperature readings. This segmentation may be useful in identifying the boundaries between hot and cold areas that is useful in detecting the location of a lateral opening.

3D Space Projection. Prior to outputs from the infrared recognizer 42 and the RGB recognizer 41 being input to the ensemble predictor 50, those 2D recognizer outputs are mapped and projected into 3D space. The projected 3D location may be a function of camera position, camera field of view angle, pipe diameter, box coordinates.

Point Cloud Recognizer. As will be appreciated by those skilled in the art, a point cloud is a discrete set of data points in 3D space. Point clouds may be generated by 3D scanners or by software which measures a plurality of points on an external surface of an object. In an embodiment, the point cloud may be generated by any spatial distance sensor. In an embodiment, a LIDAR sensor or camera may be used. However, other spatial distance sensors may include ultrasonic, stereoscopic vision, or other methods for generation of point clouds. A point cloud recognizer 43 may include using artificial intelligence algorithms such as deep neural networks to transform point cloud data to 3D bounding boxes and 3D coordinates of the features and defects in the surrounding environment.

In an embodiment, a point cloud may represent a section of a pipe. Using either a heuristic-based approach or a deep-learning based approach, predictions of the pipe's features and defects may be produced. In a deep learning-based approach, historical point cloud data collected using sensors 20 in real pipes may be used as training data.

Figure 10:
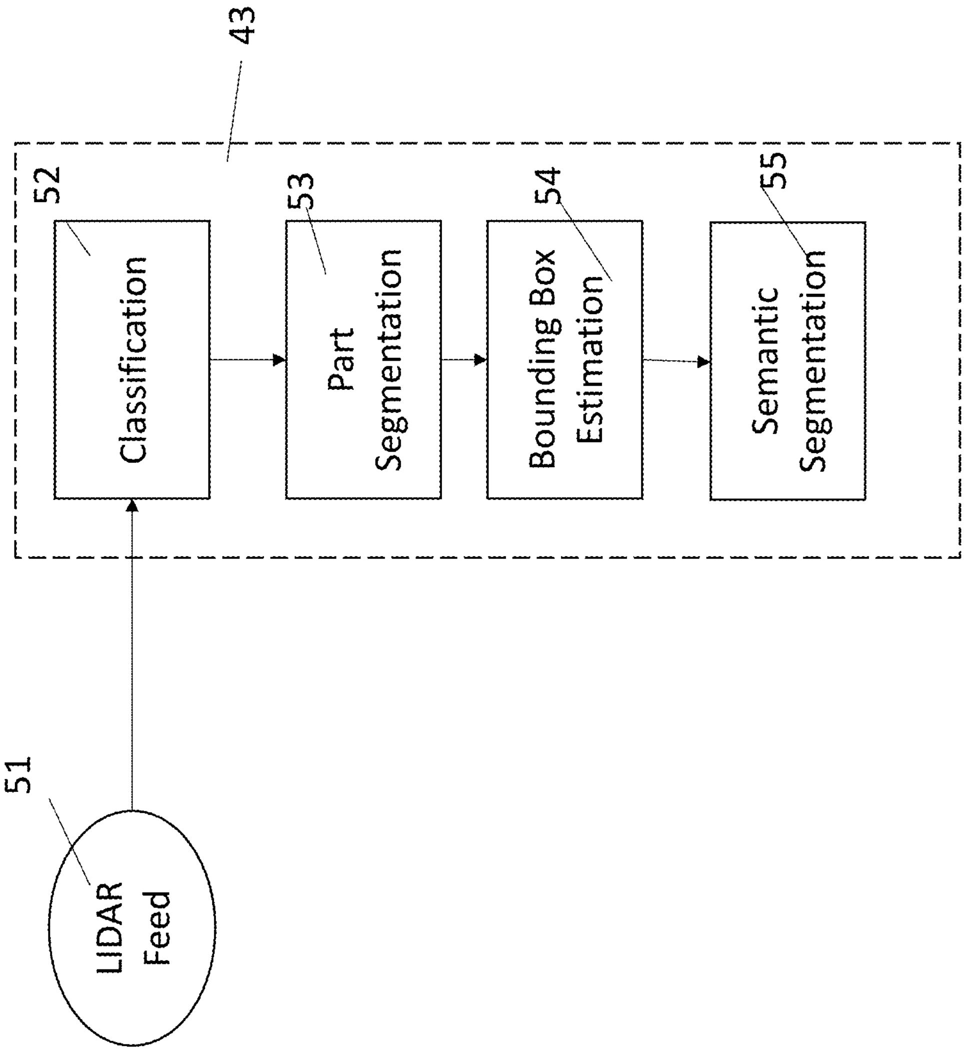
FIG. 10 is an exemplary flow chart for the processing in a point cloud recognizer.

In an aspect, the point cloud recognizer 43 may use the PointNet architecture or a variant thereof such as PointNet++. With reference to FIG. 10, there is shown LIDAR feed 51 passed to the point cloud recognizer 43. A 52, a high-level classification is performed. At 53, part segmentation is performed. At 54, a bounding box estimation is applied. At 55, semantic segmentation is performed. The result is a 3D model that provides feature detection and identification.

Figure 7B:
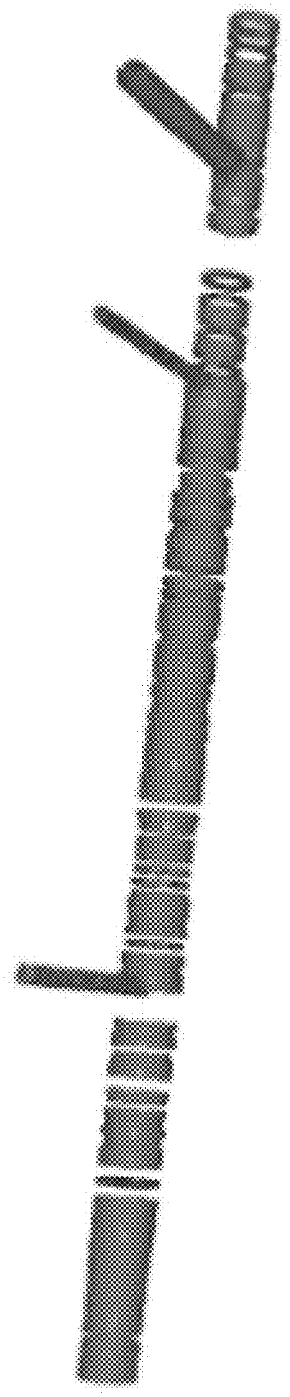
FIG. 7*b* is an exploded outer perspective view of a pipe system having laterals extending therefrom.

The point cloud recognizer 43 will operate to detect and classify specific aspects of the environment. For example, the point cloud recognizer 43 may detect the lateral in a pipeline environment in which one pipe joins into another which may, for example, include one discharge pipe draining from a house into a main line discharge pipe. An example configuration is shown in FIG. 7*b*. Where the two pipes intersect there may be a change to the circumference measurements of the LIDAR data. Assuming that the main discharge pipe has a cylindrical shape, there is typically a protrusion configured radially out from the cylinder. The point cloud recognizer will detect this change with a combination of statistical analysis and deep learning models to define the segmentation boundary at the contour of the lateral by listing a series of 3D coordinates.

Figure 7C:
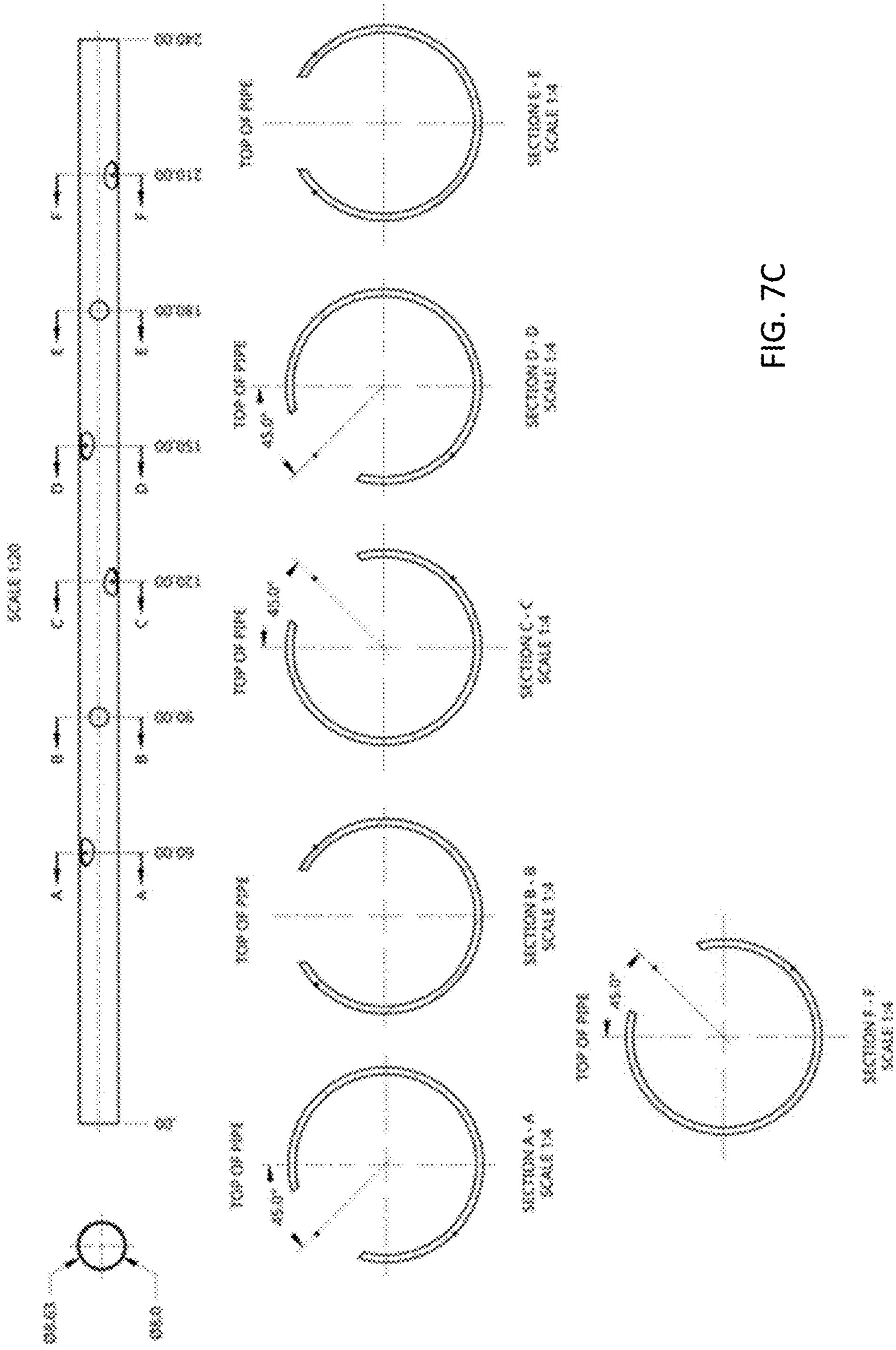
FIG. 7*c* is an exemplary schematic diagram showing the distance between laterals in a pipe and the pose of such laterals extending from the pipe.

An example of the 3D coordinate projections with respect to detection of laterals is shown in FIG. 7*c*. This schematic diagram defines the distance and relative locations of the laterals. As the robot 42 drives through the pipe, LIDAR sensors scanning of 3D points will generate data such as that shown in FIG. 7*b*. The point cloud recognizer 43 will then compute the 3D coordinates which describe the contour of the laterals.

Ensemble Predictor. The combination of the various recognizer outputs may be combined in the ensemble predictor 50 in which a linear rule-based model combines the prediction results from each of the afore-mentioned recognizers. The ensemble predictor 50 may combine the sensor data and the recognizer outputs to cross-reference readings to ensure or increase accuracy. Additional cross-references between 2D pixels and 3D coordinates may also be performed. For example, 2D data from the RGB sensor can be translated to 3D for comparison with LIDAR 3D data. At the same time the 3D LIDAR data is translated into 2D for comparison with the 2D RGB sensor data. The comparisons can be combined to reach a final conclusion regarding a particular feature to be detected.

Weights may be assigned to each of the different recognizer outputs to derive a result with a predicted confidence level. The rules may be adopted, tested and updated through actual test data accumulated from the various sensors 20. The result of the processing of high quality, multi-modal data collected from the sensors within the pipe may be an optimized.

Figure 11:
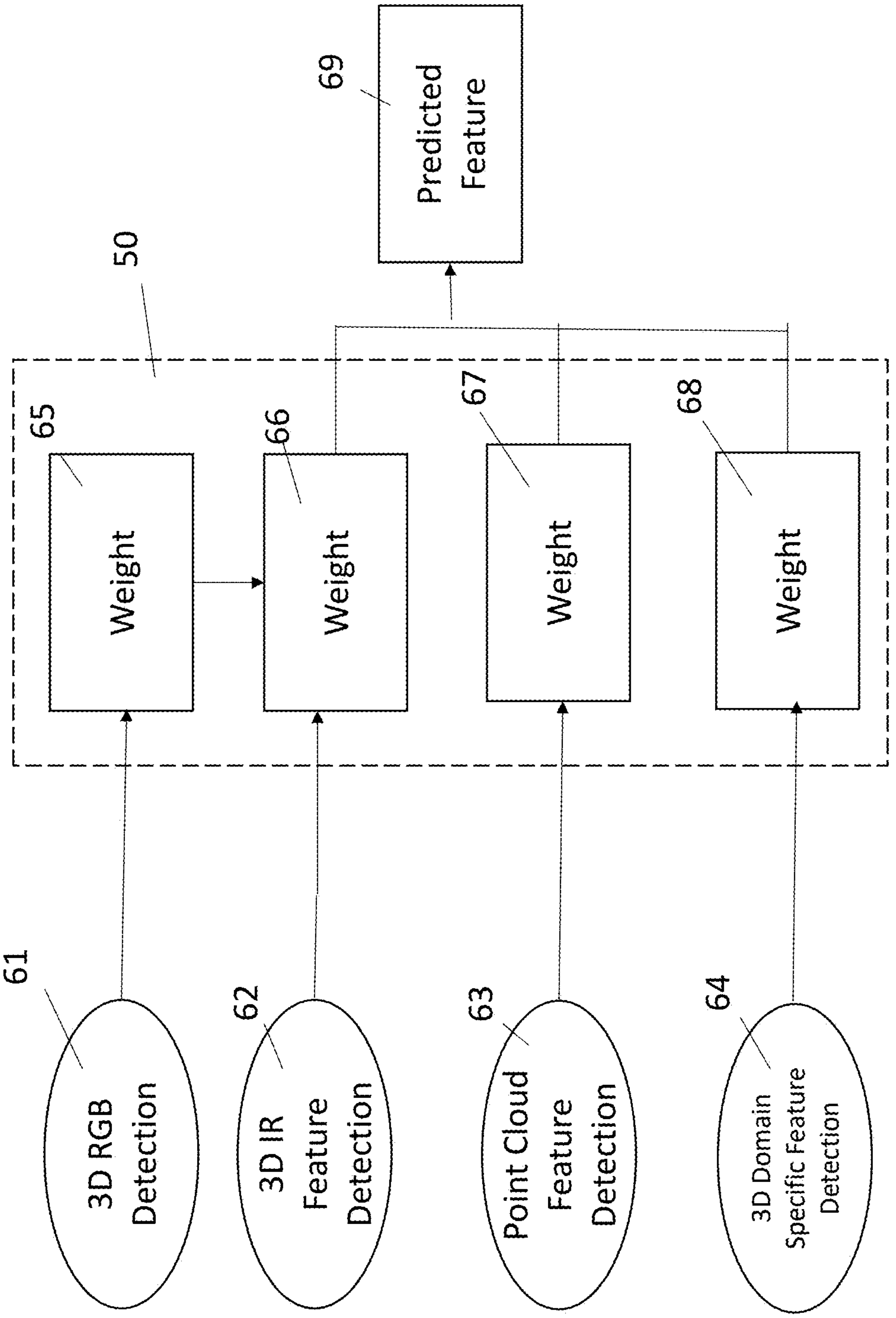
FIG. 11 is an exemplary flow chart for the processing in an ensemble predictor.

The ensemble predictor may use a heuristic weighting algorithm. For example, and with reference to FIG. 11, there is shown an ensemble predictor 50 having from the outputs of the various recognizers projected into 3D spatial coordinates. Inputs may include one or more of 3D RGB image detections 61, 3D IR image detections 62, point cloud feature detections 63, and/or 3D domain specific feature detections 64. Each of the inputs may be weighted by weights 65, 66, 67, 68, respectively. The algorithm will then operate on the inputs as adjusted by the respective weights to derive a predicted feature 69 having a probability associated therewith.

By way of example, different sensors 20 may be recording data from a current location at different times based on each sensor's individual perspectives and fields of view. Each sensor knows the sensor's pose, namely its position and orientation, within its own scan frame of reference. The sensor fusion system 27 is aware of each of the plurality of sensor's relative frame of reference to the other sensors' frames of reference and relative to the scan frame of reference. In operation, one sensor may gather data relative to a specific location while the other sensors may not have collected any data or only minimal data relative to that specific location. When that happens, weights of each of the sensors may be dynamically adjusted as the specific location is being mapped.

In accordance with another example, weights may be used and dynamically adjusted based on levels of confidence. Depending on the specific detection algorithms used, the exact level of confidence will vary. However, most deep learning methods and statistical based methods will have an associated confidence score relating to the predictive outputs. In an embodiment, the weights used by the ensemble predictor 50 may dynamically adjust based upon the confidence level derived for each of the detectors. In some cases, the weight may directly equal the confidence level or be based on relative confidence levels among the various detectors. Additionally, in alternative embodiments, the weights may also be based upon the historical data including previous readings, a priori information or manually input information or other parameters which may be unique to the operating environment and the combination of sensors being used.

Pipeline Domain Specific Recognizers. In accordance with the present disclosure, additional domain specific recognizers may be included. For example, in pipeline scenarios, the ability to detect and map lateral features of a pipeline system may be accomplished by a lateral recognizer. In the case of a lateral recognizer, a deep learning based visual detection model may be used which operates on the detected point cloud outliers outside of a defined area such as an eclipse. For example, the lateral recognizer focuses on the fact that the robot is located in a pipe. The most likely geometry to be found is a circular one. Even the lateral openings are circular or near circular. Thus, the recognizer can, among other things, look for differences from an expected circular shape to recognize features.

Additionally, or alternatively, a water sag recognizer may be deployed. The water sag recognizer may use LIDAR sensor data such as intensity and image segmentation models for water.

Additionally, or alternatively, a joint offset recognizer may be deployed. In the case of a joint offset recognizer, sensors may detect diameter changes based on point cloud diameter measurements. In this case, a deep learning-based algorithm may be used based on a visual detection model. Alternatively, or additionally, IMU sensors may detect a bump in the pipeline signifying a joint in the pipeline.

Additionally, or alternatively, a root recognizer may be deployed. In the case of a root recognizer, a deep learning-based algorithm may be used on visual sensor data from a camera 22 and/or point cloud data to map the location of roots which may have breached the integrity of the pipeline.

Figure 12A:
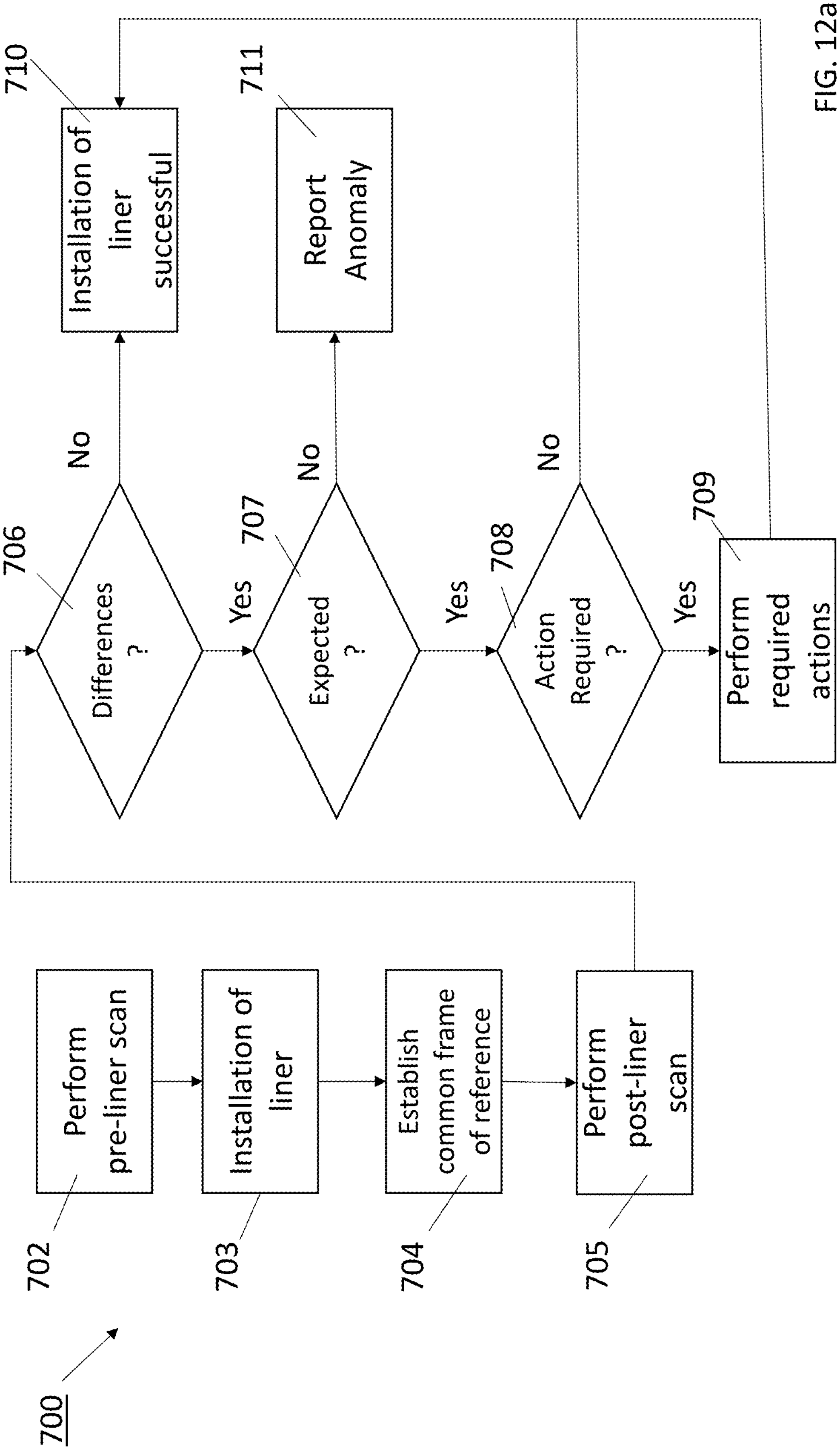
FIG. 12*a* is an exemplary flow diagram showing the process for scanning of a pipe environment prior to and after inserting a liner within the pipe.
Figure 12B:
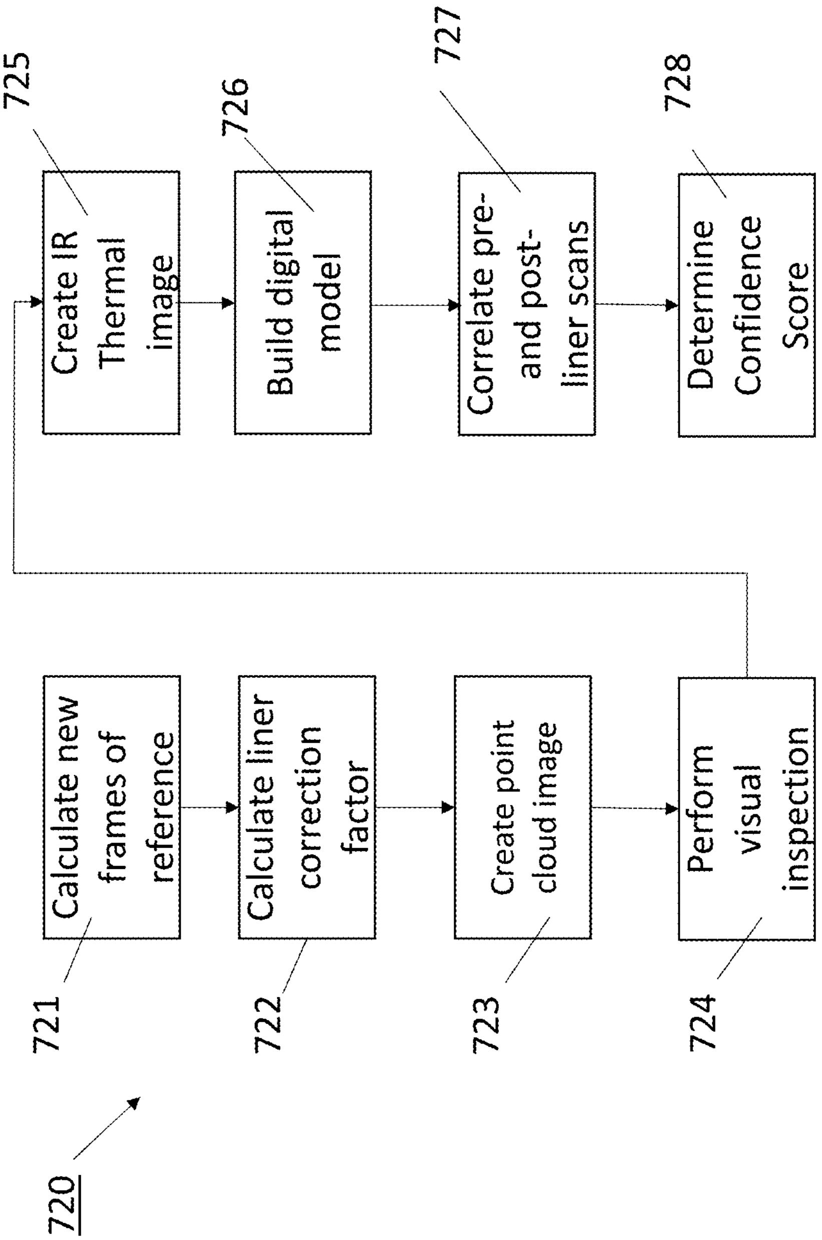
FIG. 12*b* is an exemplary flow chart of the algorithms which may be deployed for practicing the methods of the present disclosure.

With reference to FIG. 12, there is shown an exemplary process 700 for a post-liner insertion scan which may be used to confirm that a liner was properly installed in a pipe so that services may be located and cutting operations performed. At 702, the pre-liner scan is performed in accordance with the exemplary process described above with respect to FIG. 6. At 703, the liner is installed in accordance with processes known by those skilled in the art. At 704, a common frame of reference is established between the pre-liner scan and the current scanning operations. At 705, the post liner scan is performed. A series of checks may then be made. For example, at 706, there may be a determination as to whether there are differences between the pre-liner scan and the post-liner scan. The post-liner scan may detect that the liner was not installed correctly or is damaged. For example, the liner may have collapsed. Ground water may have collected between the pipe and the liner. Other anomalies associated with the installation of the liner may have been detected, including sagging at various locations. One difference that is likely to be detected is the reduction of the diameter of the pipe based on the thickness of the installed liner. In one embodiment, data concerning standard pipe sizes, liner thicknesses and types of curing may be stored in a look up table for selection by an operator. Knowing the thickness of the liner and the corresponding expected diminished diameter may also be used as a check on the quality of the liner installation. If there are no anomalies detected at 706, then the installation of the liner was successful at 710. If there were differences, then the determination of whether these differences were expected is made at 707. If not, then there is likely an anomaly that is reported at 711. If there were expected differences at 707, the determination is made as to whether any action is required at 708. For example, there may be expected differences in that services are not open but rather obscured by the liner. An expected difference may be water in the pipe or may be a difference in temperature detected based on an IR scan due to the installation of the liner. If there are no unexpected differences, the installation of the liner was successful and reported at 710. If there are expected differences that can be corrected, then corrective actions are performed at 709 to complete the success installation process at 710.

In a post liner scan, adjustments in the mapping calculations may need to be made to account for the thickness of the liner. For example, if the liner is 4.5 mm thick, then the robot will be lifted by that amount and the interior diameter of the pipe will be decreased by twice that amount. As such, a new frame of reference for the post liner scan may be calculated to account for the different dimensions. An IMU may be able to touch an interior wall to recalibrate the frame of reference to a new starting point (0, 0, 0) and to re-orient the robot within the environment.

Moreover, distances with the decreased diameter will also change and need to be recalibrated. The new distance may be represented by the following:

$$D_{Final}=D_{Initial}+\text{Liner correction factor.}$$

The correction factor will lessen any errors in navigating the robot to a service location. Inertial sensors may be used to recalculate distances traveled. A cable encoder may also be used as a rough measurement to provide a second data point with respect to the distance traveled. A table may be built that maps the number of rotations with distance.

With reference to **12*b*, there is shown an exemplary flow chart of a post liner scan 720. At 721, new frames of reference are calculated based at least on the reduced diameter of the pipe with the liner installed. At 722, a liner correction factor is calculated for use in comparing pre-liner scans and post-liner scans. At 723, LIDAR is used to derive a point cloud image. At 724, a visual inspection with a 2D, RGB camera is performed. The visual inspection may, for example show a bulge in the liner at the position of the laterals. At 725, an IR thermal image is created, which may, for example, be mapped into 3D space. At 726, a multi-sensor digital model of the interior of the liner is built. At 727, the pre-liner and post liner scans are correlated using at least the liner correction factor. At 728**, a confidence score is calculated which is a measure of the confidence in accuracy of the post liner scans, namely whether the service locations line up correctly. In some instances where a sufficiently high confidence level is not achieved, the system will automatically default to having a human operator locate and re-establish connection with the lateral opening. It shall be noted that the above order of steps is exemplary only and certain steps may be performed in alternative orders. For example, the IR image may be created prior to the visual inspection in certain embodiments.

Using deep learning modules, confidence score may be calculated and increased over time through retraining and updating of the model. For example, based on the comparison of preliner images and post-liner images, the deep learning modules may look for correlations between the two and perhaps weight the prelining scan higher than the post lining scan. The IR image may be weighted more than the point cloud image as the temperature gradients identified in the IR image may be more indicative of service locations.

Figure 13:
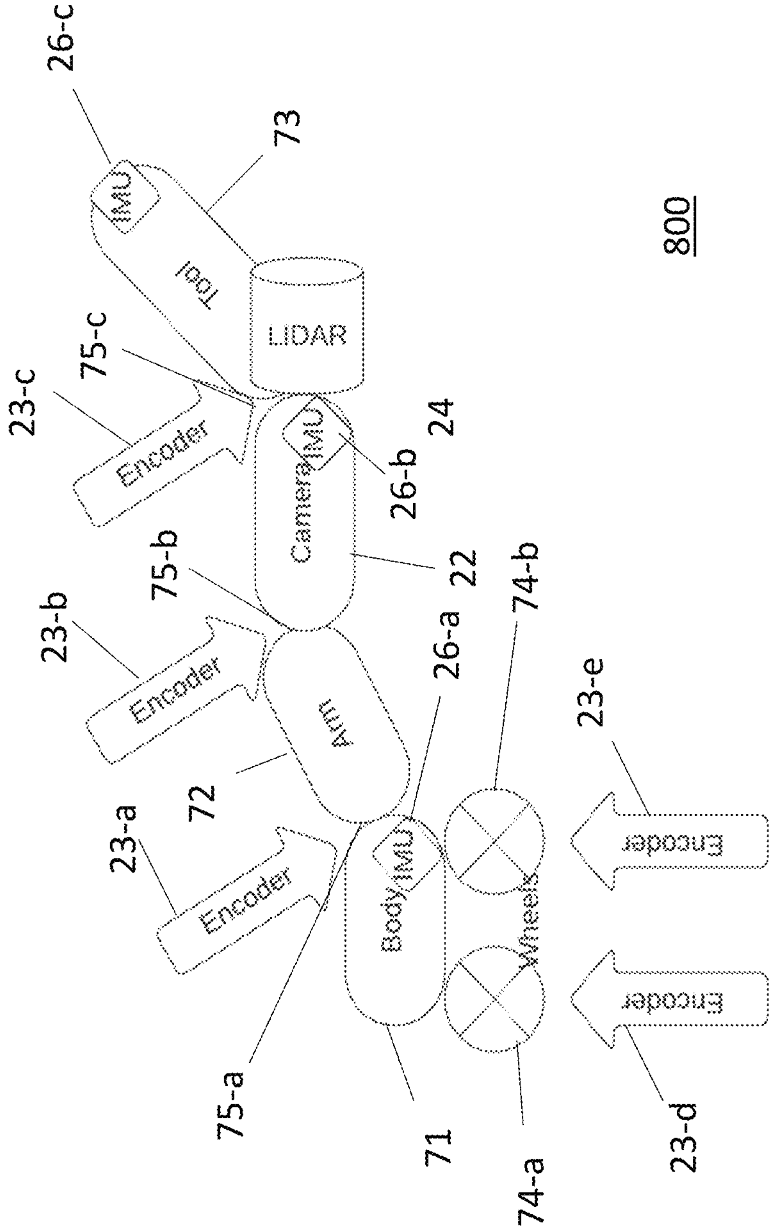
FIG. 13 is an exemplary block diagram of an articulated robot having multiple sensors mounted throughout the robot.

Robotic System. FIG. 13 is an example robotic system 800 according to the present disclosure. The robotic system 800 of FIG. 8 can be an example of the robot shown in FIG. 1 or 2 and can include the processing capabilities discussed with reference to FIG. 3.

The robotic system may include different sensors at different positions on the body 71 and joints of the robotic system. Each of the sensors may perform different measurements, where the different measurements from the various sensors may be processed, thereby providing useful information. Example information may include distance moved by the robot, absolute position in a given environment, relative position between positions in the environment, orientation of observations within the environment, diameter or other size of the environment (e.g., a pipeline environment), or a combination thereof. This collection of measurements, processing of measurements, and generating of information will be described in more detail below.

The robotic system 800 can include a variety of hardware and associated sensors for collecting signals and measurements for further processing and analysis. For example, the robotic system 800 may include a body 71, an arm 72, a camera 22, a LIDAR camera 24, a tool 73, and a set of wheels 74-*a* and 74-*b*. A joint may be defined between respective adjacent components of the robotic system 800. For example, a joint 75-*a* may be defined between the body 71 and the arm 72; a joint 75-*b* may be defined between the arm 72 and the camera 22; and a joint 75-*c* may be defined between the camera 22 and the tool 73. Each respective joint may include a motor (not shown), which may be configurable to actuate a component of the robotic system 800 with respect to an adjacent component defining the joint. For example, a motor may be disposed at the joint 75-*a*, which may actuate the arm 72 with respect to the body 71. A motor may be disposed at the joint 75-*b*, which may actuate a portion or the arm comprising the camera 22 with respect to the arm 72. A motor may be disposed at the joint 75-*c*, which motor may actuate the portion of the arm comprising the tool 73 and/or the portion of an arm comprising the LIDAR camera 24 with respect to the portion of the arm comprising the camera 22. In some cases, the actuation may be a rotation or pivot, where the corresponding adjacent component acts as a pivot point for the actuation.

The robotic system 800 may include one or more motor encoders 23. Encoders may measure the rotation of a motor spindle for a motor of a joint 75 and record the rotation change via electrical signal. For example, encoder 23-*a* may record measurements of movement of the motor disposed in the joint 75-*a*, encoder 23-*b* may record measurements of movement of the motor disposed in the joint 75-*b*, and encoder 23-*c* may record measurements of movement of the motor disposed in the joint 75-*c*. These recordings may result in a count of electrical pulses that correlates to the relative rotation. Each motor-encoder pair may include different gear ratios to determine the absolute rotation angle according to the encoder counts. These configurations may be based upon the mechanical properties, calibration and testing results as well as any runtime feedback provided in the system.

In some cases, encoders may be located at or near each wheel to record the rotation of a respective wheel. For example, the robotic system 800 may include a pair of wheels 66-*a* and 66-*b*. Each wheel 74-*a* and 74-*b* may include an associated encoder 23-*d* and 23-*e*. An encoder corresponding to a wheel may record linear movement, such as forwards or backwards. As an example, the encoder measurements may determine if the robot is conducting a turn if one wheel is determined to be moving and another wheel is determined not to be moving. In some cases, joints corresponding to a robot head, a robot arm, a robot camera, and/or a robot tool, may each include a corresponding encoder. The encoders may measure rotation of the respective joint.

The robotic system may also include a number of IMUs 26 disposed at various locations along the system. For example, the body 71 may include an IMU 26-*a*, the camera 22 may include an IMU 26-*b*, and the tool 73 may include an IMU 26-*c*. An IMU may be disposed within or on the robot, where the IMU may provide acceleration readings and/or orientation readings. These readings may be made available over a CAN bus. The measurements taken from the IMU(s) may in some cases used for generating and updating frames of reference for the robotic system 800, which are described in more detail below. For example, the measurements collected by the IMU associated with the body 71, IMU 26-*a* may form the origin for the Scan Frame of Reference. Measurements collected by the IMU associated with the camera 22, IMU 26-*b* may be the origin of the Sensor Frame of Reference. Measurements collected by the IMU associated with the tool 73, IMU 26-*c* may be used by the system to identify or determine the relative orientation of the tool in relation to the camera and body.

The feedback and controls of the robotic system will operate on the robot during real time operations. Sensor data, specifically LIDAR sensor data, will be processed as the robot is moving within the environment. As such, motion of the robot may be calculated and any corrective action may be executed in real time.

In order to move between two positions, the robot system may utilize inverse kinematics to convert the 3D points (XYZ) into joint movements. The joints are defined as either prismatic (linear) or revolute (rotation). The prismatic joints result in motion in a straight line along some axis of movement. Motion in multiple axes is handled as multiple connected prismatic joints. The revolute joints result in motion about an axis of rotation. There is no practical limit to the connection of the joints. Kinematic calculations are used to control the movement and the order in which the joints operate. The joints are interconnected to allow for the motion of one joint to affect the relative position and orientation for the down-stream joints.

The calculations of the inverse kinematics will be based upon the trajectory (path) planning operation. The path planning operation is optimized based upon system calibration to result in smooth and continuous motion from the current position to the target position. The planned path will account for differences in relative velocities of the joints as well as understanding limitations of the motion of any joints. For example, some joints may be able to move freely throughout the entire range of their motion. This would include a revolute joint which can rotate a full 360 degrees without mechanical stop. This can also include a prismatic joint with no motion limits such as a wheeled device which is able to roll unbounded in either direction. Other joints may have limits or motion based upon the physical construction of the robotic system. Revolute joints may be limited in rotation because the rotations would result in binding one joint arm against another.

There may be other constraints on motion of the joints which are not based upon the physical construction of the robot but based upon other parameters. There may be a revolute joint which prohibits the rotation beyond a limit in order to prevent undesired positions. This may be to eliminate risk of gimbal lock, this may be to prevent tipping over, this may be to always present useful visualizations to the operator.

Another reason to limit the motion of joints is to prevent collisions within the environment. One of the primary collisions to avoid is to accidentally cut the pipe in a location which is not meant to be cut. The map from the initial scan will have both the location of all the services to cut as well as full digital twin representation of the pipe. This will allow the robotic system to know in advance the 3D coordinates to limit the range of motion for the operating window of each joint. This means that in cases where there is an 8-inch diameter, the position of the cutting bit cannot extend to a position outside this diameter unless actively attempting a cut into a service.

Knowing all of the constraints the robotic system will iterate through the motion to continuously move the robot smoothly through the environment. This motion will also take live feedback from the sensors in the robotic system to detect and react to unexpected conditions. Operation of the robot can be improved through weighting of sensor readings. For example, when one of the jointed appendages of the robot is moved (e.g., as for cutting the liner), its motion is tracked by both encoders at the joints and IMUs. The readings are compared, but the readings from the encoder are given a greater weight than those of the IMUs, particularly when the readings of both are in agreement within a tolerance. However, if the readings diverge beyond the tolerance, the IMU readings are given a greater weight. This is done because a divergence in readings is most likely indicative of a condition that is causing the encoder to be in error (e.g., the appendage has engaged an obstacle). Similarly, a tether for the robot can be accurately read to determine the distance the robot has traveled down the pipe and thereby to determine the position of the robot in the pipe. Again, the IMU can also be used to establish position. When the readings of the IMU and the tether distance agree within a tolerance, the readings of the tether distance are given greater weight. However, if the readings diverge from one another outside of the tolerance, the IMU reading is given greater weight. Again, if a large divergence is experienced it is far more likely that a condition has been encountered which disrupts the accuracy of the tether distance measurement than that of the IMUs.

A machine learning model may be used to apply the inverse kinematics calculations to control the movement of the robot and to use the live feedback from the sensors to adjust the path, poses, speed, or other parameters. For example, given the robotic attachment's (e.g., a cutting tool's) end location, a neural network algorithm or an anomaly detection algorithm may be used to calculate and coordinate the movements of the various joints and wheels associated with the robot in order to deliver the robotic attachment to the desired location which may, for example, be a cutting tool moving to a position for a lateral cut. For example, scanning for a lateral opening may be started when the robot has reached a location that was marked as containing a lateral opening in a prior scan. Segmentation of the sensor readings occurs and a bounding box is digitally drawn. A confidence level is calculated. If the confidence level is over a threshold the location of the lateral is confirmed and cutting operations can begin. If the confidence level is not sufficiently high further scanning may be done to approach verification of a lateral opening location through an iterative process.

Previous scans may have been used to create a digital twin of the environment. Such previous scans may have been performed prior to a liner being inserted and after a liner has been inserted in the pipe. As set forth above, such previous scans may have been created using machine learning models. As such, the models may have been trained training data in which joint movements are associated with various locations and poses of the robot within the environment.

The LIDAR sensor data is not stationary since the robot may be moving during the scanning operation. A LIDAR frame of reference may be calculated based upon the kinematics of the robot, which will be tracked as the pose of the LIDAR. The updates to the pose may be calculated continuously or updated within a certain time period to support the real time processing of the scanning and navigating processes. The specific limits may vary and may be dynamic based upon the current operation of the environment in order to minimize any possible error associated with latency during movement.

Frames of Reference. In order to accurately scan and locate service areas as part of the scanning operations, frames of references within the interior pipe need to be determined. Namely, there may be a global frame of reference, a scan frame of reference, a robot frame of reference, and a sensor frame of reference. Each of the foregoing frames of reference consider the pose of the robot within the environment, which pose may, for example, include x, y, z coordinates and the orientation within the environment, while the global frame of reference may encompass an entire project.

The scan frame of reference may be absolute data within a given environment, such as a pipeline, but relative to the location of the given environment in the global frame of reference. In some cases, output data and reports can be provided based on the scan frame of reference. Scan frame of reference data (e.g., distance is the start of the pipe from an access point) may include a starting point, 0. The +/− distance may be measured in a direction, which may, for example be in +/−X, Y, or Z direction. In the example where the given environment is a pipeline, the +Z can be down the pipe, level to the earth level (e.g., no inclination). The +X can be vertical (12 o'clock=0°). The +Y can be horizontal to the right (3 o'clock=90°). The +X and +Y can be mapped orthogonal to +Z. In some cases, rotation data can be referenced in the clockwise direction. So, for example, 12 o'clock can be 0°, which can be the +X axis, 3 o'clock can be 90°, which can be the +Y axis, 6 o'clock can be 180°, and 9 o'clock can be 270°.

The robot body frame of reference may be calculated as relative frame of reference to the body of the robot. The robot body frame of reference may be managed by IMU 26-*a* of the robot. This data may mitigate the possibility of tipping the robot over are causing the robot to become stuck, such as if auto cut for the robot is implemented. For the robot body frame of reference, +Z may be straight ahead. +X may be straight up. +Y may be straight right. +X and +Y may be mapped orthogonal to +Z. In some cases, the rotation data can be referenced in the clockwise direction. For example, 12 o'clock can be 0°, which can be the +X axis, 3 o'clock can be 90°, which can be the +Y axis, 6 o'clock can be 180°, and 9 o'clock can be 270°.

The sensor frame of reference may be a relative frame of reference of the sensor platform associated with the robot. The sensor platform may pan, tilt, and rotate relative to the robot body frame of reference. Sensor data may be transformed into the scan frame of reference to perform calculations. For the sensor frame of reference, +Z may be straight ahead. A 0 distance may be the start of the data gathering and/or after calibrations. A +distance may be in the +Z direction. +X may be straight up. +Y may be straight right. +X and +Y may be mapped orthogonal to +Z. In some cases, the rotation data can be referenced in the clockwise direction. For example, 12 o'clock can be 0°, which can be the +X axis, 3 o'clock can be 90°, which can be the +Y axis, 6 o'clock can be 180°, and 9 o'clock can be 270°.

In performing a scanning operation, the pose XYZ coordinates may be derived within the fusion layers based upon the kinematics of the robot. The fusion layers are the individual sensor readings as fused together through comparison and weighting as discussed elsewhere herein. The pose XYZ coordinates may be reported as the center of the LIDAR readings within the scan frame of reference and be used as the origin for the sensor frame of reference associated with LIDAR (i.e., the LIDAR Frame of Reference) for such calculations and subsequent calculations until a new updated pose XYZ is received. Each updated pose XYZ may be timestamped to coordinate and correlate the various readings and to verify that the most current pose XYZ data calculations are being used.

The pose orientation angles may also be derived within the fusion layers based upon the kinematics of the robot, IMU readings and other sensors. The pose orientation may be reported as the rotation angles about the XYZ axis based on the scan frame of reference to the LIDAR frame of reference.

By way of example, for each LIDAR XYZ sample, LIDAR XYZ data may be determined by translating a pose XYZ from the LIDAR frame of reference into a scan frame of reference. The LIDAR XYZ data may then be rotated about the pose XYZ by the pose orientation to determine the scan XYZ, which is the 3-dimensional output point within the scan frame of reference.

Figure 14:
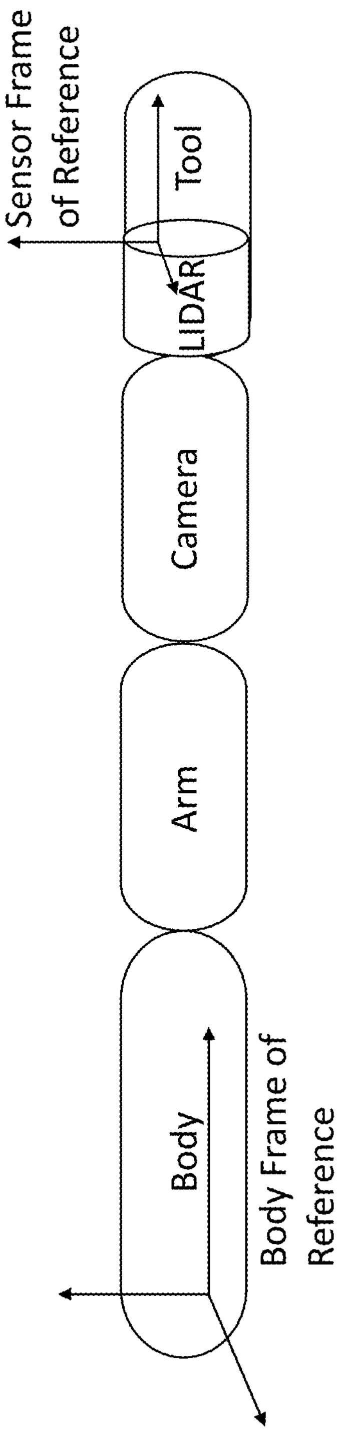
FIG. 14 is an exemplary block diagram of the robot of FIG. 13 highlighting frames of reference.
Figure 15:
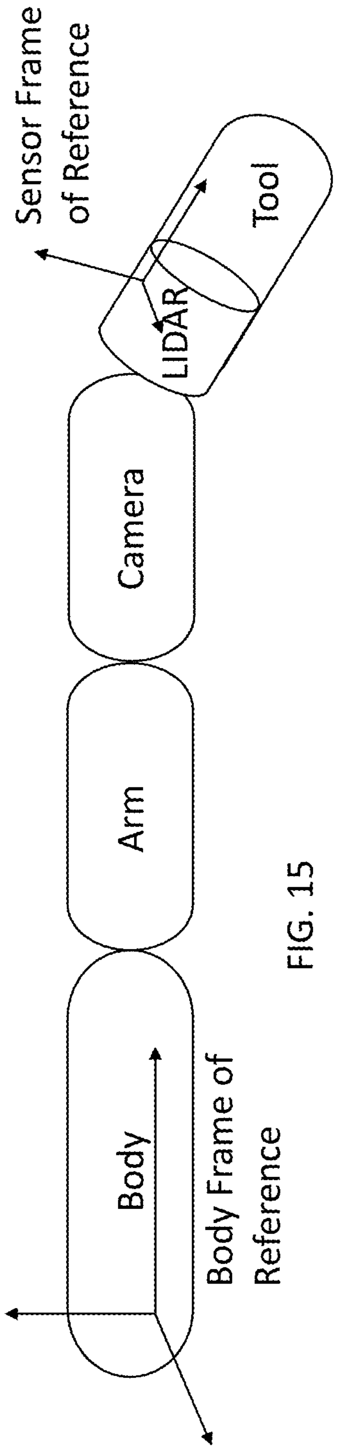
FIG. 15 is the block diagram of FIG. 9*a* showing a tool of the robot turned at an angle.

FIGS. 14 and 15 are exemplary diagrams showing a robotic system and a body frame of reference and a sensor frame of reference.

Service Location. As services are detected and their locations are recorded the system will save and record all services within the map which will then be used for reference during the cutting step. The mapping step of the first scan will be used to create a sufficient digital representation of the environment that can be used for the localization in the later phases. The map will include all of the 3D representation points of the environment including nominal diameter, location of all key observations and references within the pipe. As the robot system moves through the environment this map will continuously be updated and adjusted based upon the latest readings.

Specifically, the location of the services will be described by 3D coordinates which describe the outline contour of the service opening in order to describe fully the series of points which outline the contour. In an aspect, there may be an option to determine a service location requiring a circular cut using a center coordinate and a radius of the desired circular cut. This can include a description to augment the circle by stretching or compressing different dimensions of the circle. Other compressed shape descriptions are also possible, including an ellipse with different height and widths, a rectangle having four corners, or any number of sides of an irregular polyhedron comprising a list of points sufficient to describe the irregular polyhedron. Each point in the list will correspond to a vertex of the polyhedron in the order which describes the outline of the contour of the polyhedron. For a more precise representation more points can be used within the list. The system may dynamically adjust the number of points necessary to uniquely describe the service based upon the complexity of the service, memory usage and time to operate on the service.

This map can be reloaded by the same robot system or can be stored and uploaded to another robot system. This allows for work to occur at different times. So, the scanning service may occur during a different day and possibly by a different operating crew. Each scan will have unique descriptors which allow the entire collection of robots and the fleet management system to coordinate the data and maps between each robot. For example, descriptors may include date and time of day of a scan, a serial number of a robot performing the scan and/or the sensors used by the robot, external environmental data which may affect the scan, an operator identification, and other data which will uniquely describe a scan. Another benefit from this data synchronization is to handle a device failure of the robot and allow the operators to swap in a spare robot without delay or loss of functionality.

Figure 16:
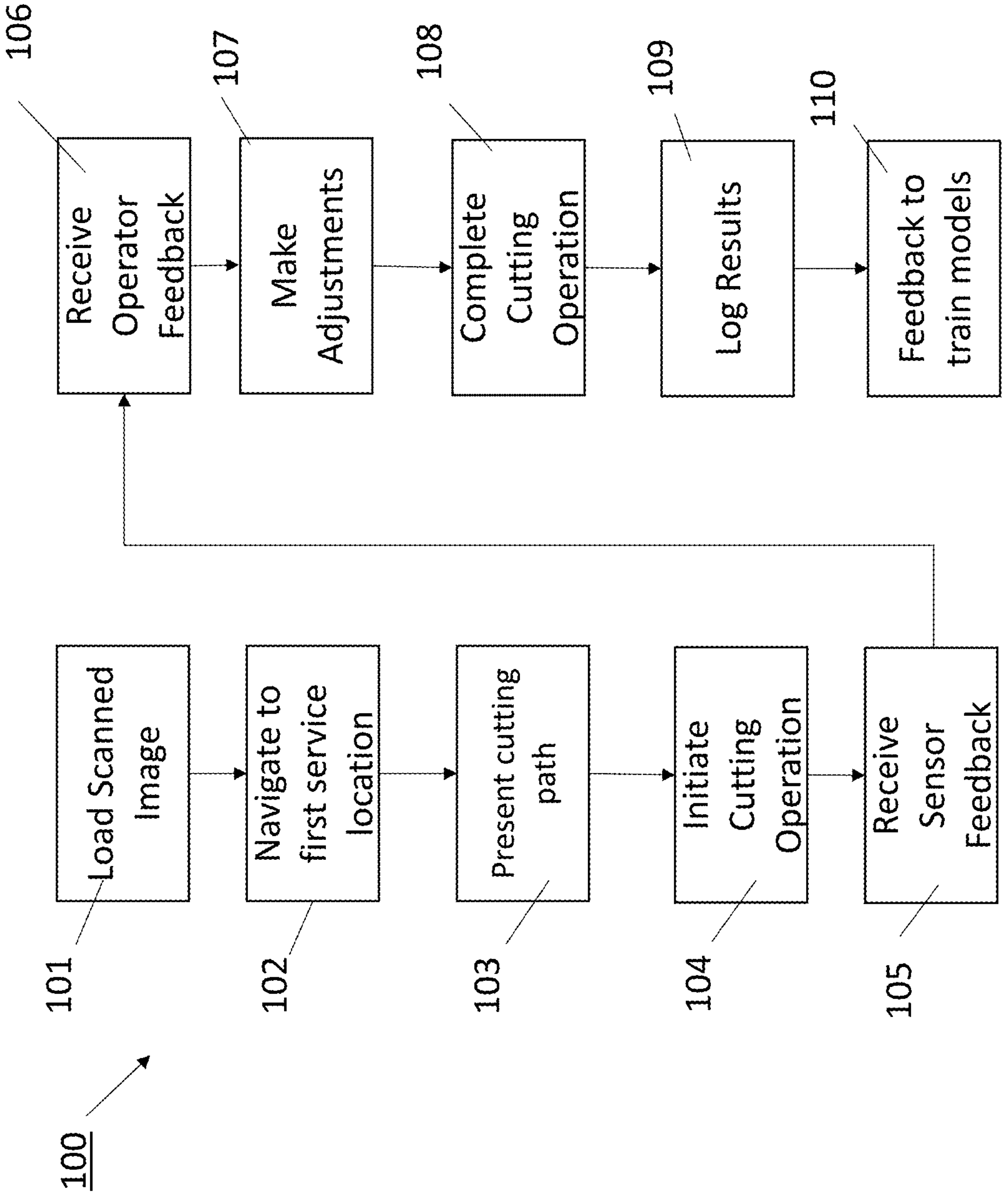
FIG. 16 is an exemplary flow diagram of a cutting process.

Navigating and Cutting in the Mapped Environment. With reference to FIG. 16, there is shown an exemplary process 100. Prior to performing any services such as cutting, the robotic system performing the service will load the scanned digital image at 101. During the loading process, the system may then determine an optimized navigation path and sort the services based upon the optimized path. At 102, the robot may navigate to the first service location. For example, the robot may navigate to the furthest position first to perform a first process and then reverse course towards the origin as it performs additional processes at each service location. In addition to creating efficiencies, processing in this order may prevent any processing such as cutting operations from causing issues with navigating through the mapped environment. By going to the furthest position first, the full scan and digital map may be validated and localized by the robot as it runs the detection of the services for cutting. It will be understood that navigating to the furthest service first is an example only, and the order of processing at the various service locations may vary. By way of further example, the sorting may be based on the types of processes to be performed at the various service locations which may reduce the number of times that a particular bit or tool needs to be replaced.

At 103, the cutting path may be presented, which may, for example, include an outline of the target cut, bit selection, bit speed, and other parameters associated with the cut. At 104, the cutting operation is initiated. As used herein "cutting path" of the cutting tool includes radial movement toward and away from the robot, lateral movement with respect to the robot, pivoting, rotating or a combination of these movements. During the cutting operation, real time sensor feedback will be generated and received at 105. At 106, an operator may provide feedback on the cut process. A 107, any adjustments deemed necessary or preferable may be made to the cutting process. At 108, the cutting operation is deemed to be completed. At 109, the results of the cutting process are logged and at 110, the sensor feedback and results of the cutting process may be fed back into the AI models for further training.

At the conclusion of a cutting process or sub-process, the robot and cutting tool may be relocated for a subsequent cut using a preprogrammed navigation and cutting path supplements by the IR overlay on RGB video camera display.

There may be an inspection phase that is separate and apart from the scanning phase or the inspection phase and the scanning phase may be the same. The speed of movement while navigating the environment may vary and be different than the speed of movement during the inspection operation or the cutting operations. During the inspection phase the robotic system may have a configurable speed of forward movement. This speed may be adjusted based upon customer requirements, operator preference, environmental conditions, or based upon system and sensor feedback. In an aspect, the robot may move as fast as possible to complete the scan operation as quickly as possible. In an aspect, the speed may be limited to ensure that the RGB camera video is viewable and not distorted or otherwise not adequately show all the observations clearly. During non-inspection operations such as the cut phase, the robot movement may be allowed to move faster between the different services to reduce the overall time within the environment.

Navigation through the environment will be monitored in real time based on the various on-board sensors associated with the robot. The movement may be set at a first faster speed initially and then, if adverse environmental conditions are detected, the robot may slow its speed or alter its course to safely or more efficiently navigate through such adverse environmental conditions. The adverse environmental conditions may be based upon sensor and system feedback from the environment, as well as operator feedback. Sensors such as the IMU, RGB cameras, LIDAR and others may detect conditions which may be conducive to lowering the speed of navigation. If the surfaces are smooth and relatively flat the robot may be able to move more rapidly than in conditions with cracks, bumps and obstructions. The sensor feedback may be used to calibrate the speed of navigation. Additionally, or alternatively, the sensor feedback may be used by adaptive machine learning algorithms to adjust to the different environments.

The speed of movement may also vary if the robotic system has been pre-loaded in the map from a previous scan. The previously scanned images contain the 3D mapping information as well as other previous sensor data which can be recalled to predict and compute a desired movement speed. If during a previous operation the robot observed some cracks or bumps, then during the subsequent scan the robot may reduce speed prior to encountering the same conditions. This will prevent possible damage or unexpected behaviors of the system by using recall from the previous scans to aid in the future movement requests. Additionally, the previous scans may contain the locations of all the previous services and other observations which the robot may be programmed to reduce speed or stop.

The disclosed system will cause the robot to move to the location of the first service. The optimized planning path will be executed by the robot using inverse kinematic calculations, using the 3D coordinates of the first the service compared (scan frame of reference) as compared to current 3D coordinates of the robot (robot frame of reference). The difference in the positions between the current robot point and the next service point will determine the direction of movement.

With respect to the cutting target, there may be a discrepancy between the LIDAR point cloud image and the IR image projected into a 3D space. In an embodiment, initial cutting may be limited to the overlap between the point cloud image and the IR image to reduce the risk of an improper alignment between the opening of the service and the cut. Once the overlapping portion is cut, a secondary cut or filing may be performed to further align the cut with the service opening. For example, a service opening of four inches in diameter may have an initial cut of three inches in diameter, and then a secondary cut or filing operation may be performed to increase the cut diameter to match the service diameter at four inches. The secondary cut may be determined from an actual service opening boundary (or portion thereof) that is revealed by the initial cut. For example, and without limitation, optical (e.g., RGB) scanners work well to define an entire opening when an edge of the opening is optically perceptible. Thus, a secondary optical scan may provide even more accurate information regarding the size, shape and location of the service opening. It will be understood that other sensors may be used, individually or collectively, to perform the secondary scan. The boundary can be used to more accurately calculate the location of the opening so that cutting of the liner may occur without contacting the pipe. Similarly, the actual boundary may be determined through detection of contact of the cutter with the pipe during the initial cut.

Cutting Operations. Once the robot reaches the location of the service, the robot will present a cutting path. There are many factors which influence the cutting path including, but not limited to the speed of cut, the precision of the cut, safety margin to the host pipe, shape and size of the service opening into the host pipe, or shape and size of the swarf (i.e., chips or shavings).

The cutting path will be computed by the robotic system based upon the map of the services. The points which describe the service will describe the outline of the polyhedron and will be used as the boundary for the cutting path.

While the final objective of the cutting action is to complete the entire cutting path as quickly and efficiently as possible, the initial cut location may prioritize accuracy, precision and safety of the operation. In an aspect, the cutting path may begin at the safest location of the service to ensure a safe cut to start the process. The location of the safest cut location may be based upon the maximum distance from any possible edge of the host pipe. This would be the location where the sensors, mapping, localization and all processing operations predict and compute there is the least likely chance of collision and damage to the host material. For example, in one instance, a branch conduit may extend at an angle to the host pipe. This can present a challenge for cutting to reestablish fluid communication with the branch conduit because a wall of the branch conduit will be located close to the opening into the host pipe. The orientation of the branch conduit can be determined by an initial scan or otherwise known. Taking this information, the robot can be automatically positioned with respect to the branch conduit opening so that the cutting tool can be extended from the robot at an angle roughly parallel to (or coincident with) a central axis of the angled branch conduit for making a cut into the liner. The chances for hitting a wall of the branch conduit are thus materially reduced.

The initial cut is started by activating the cutting tool to rotate the bit and moving the cutting tool toward the liner. This can be done by an extender that may take the form of an arm or arms. The movement of the arms is driven by one or more movement motors on the robot and tracked by sensors, such as encoders. As the initial cut is started there will be feedback on how the material is reacting to the cutting operation. There are many variables which affect the cutting operation and interaction with the material. Some of these conditions may be known ahead of time and can be calibrated or adjusted for in the calculations. These would include, but not limited to the type of cutting bit used, the thickness of the liner to be cut, the method of curing the liner, and others. Other conditions may change but such other conditions may also be derived or calculated from the sensors or other means. These include but are not limited to the age/wear on the bit, the RPM of the cutter, current draw from the cutter, current draw from other movement motors, the angle of cut, temperature of the liner at the cut, and others.

During the cutting operation the robotic system will use the known, sensed and derived inputs to make adjustments in real time or, in the event that the cutting operation is paused or otherwise delayed, in non-real time prior to re-engaging the cutting operation. The dimensions of cut will bound the cut path, but the motion within these bounds can be adjusted to ensure safe and reliable cuts. There may be some precomputed adjustments based upon known information. In an aspect, if the liner to be cut is known or determined to be thicker, the adjustments may be to slow down motion of movement during the cut. Different bits may have different calibrated and configurable feed rates. If the cutting bit is swapped out for a grinding wheel, then the feed rate of the cutting movement may slow down.

Additionally, the robotic system may make automatic adjustments based upon the sensed and derived inputs. If the revolutions per minute of the motor is sensed to be dropping, the cutting action may suffer and may damage the bit. As a corrective mechanism, the robot may slow the feed rate or reverse the direction of motion to prevent damage. As another example, if the current being drawn by the cutter is higher than anticipated, or it is taking the cutter longer than anticipated to traverse a distance into the liner. The revolutions per minute and or the feed rate may be slowed down in these circumstances. In some instances, the cutting operation may be halted if sensor readings pass a predetermined threshold.

As the robotic system performs the cut the parameters and sensors may use the live, real-time sensor feedback to make adjustments to the cutting motion. All of the sensor data, input information, operator overrides and any other available data will be saved and logged for each service cut. This information may be used for subsequent cuts within the same pipe or as training for future cuts in other environments. For example, if the feed rate needed to be lowered for one cut in an environment, the predictive algorithms may determine that the feed rate should be lowered for other cuts in that same environment. This allows for improved cutting time and reliability adjustments live in the real time operation of the robotic system.

Offline and post processing reviews and analysis can be utilized to further optimize and adjust the path planning and error recovery plans. This will utilize metrics from the scanning and cutting operations to identify possible areas of improvement. This can include reducing the overall time of scanning, limiting the time spent moving between services, reducing the time in cutting, or many other metrics which are reported. This allows the learnings and feedback from 1 robot to be applied across the entire fleet quickly and easily without the need for each robot needing to encounter the same situations.

Operator Assistance. While the disclosure has been described heretofore as relating to systems and methods of controlling and employing an autonomous robot deployed within a constrained environment, the disclosure also includes an operator interface which may be based on digital twins of the environment or digital twins augmented with live sensor data such as a 2-dimensional video camera or a 3-dimensional thermal image, creating images based on virtual reality or augmented reality. The operator interface may be local to the environment or remote. Additionally, the operator may interject into the movements of the robotic system. The operator may observe conditions that the robot has not yet detected, or other reasons the human intervention is advantageous.

Figure 17:
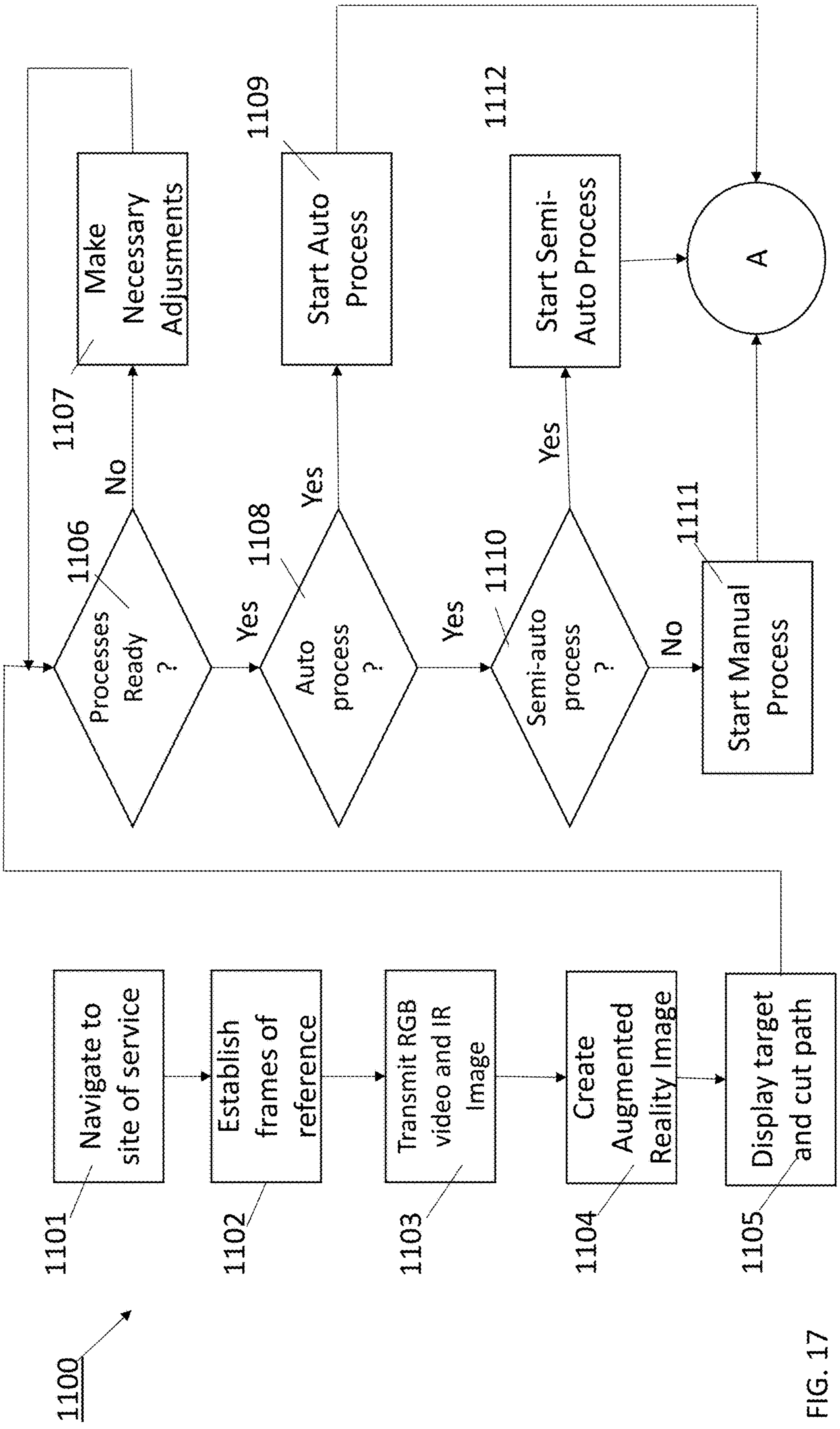
FIGS. 17 and 18 comprise an exemplary flowchart showing operator-assisted augmented reality cut processes.
Figure 18:
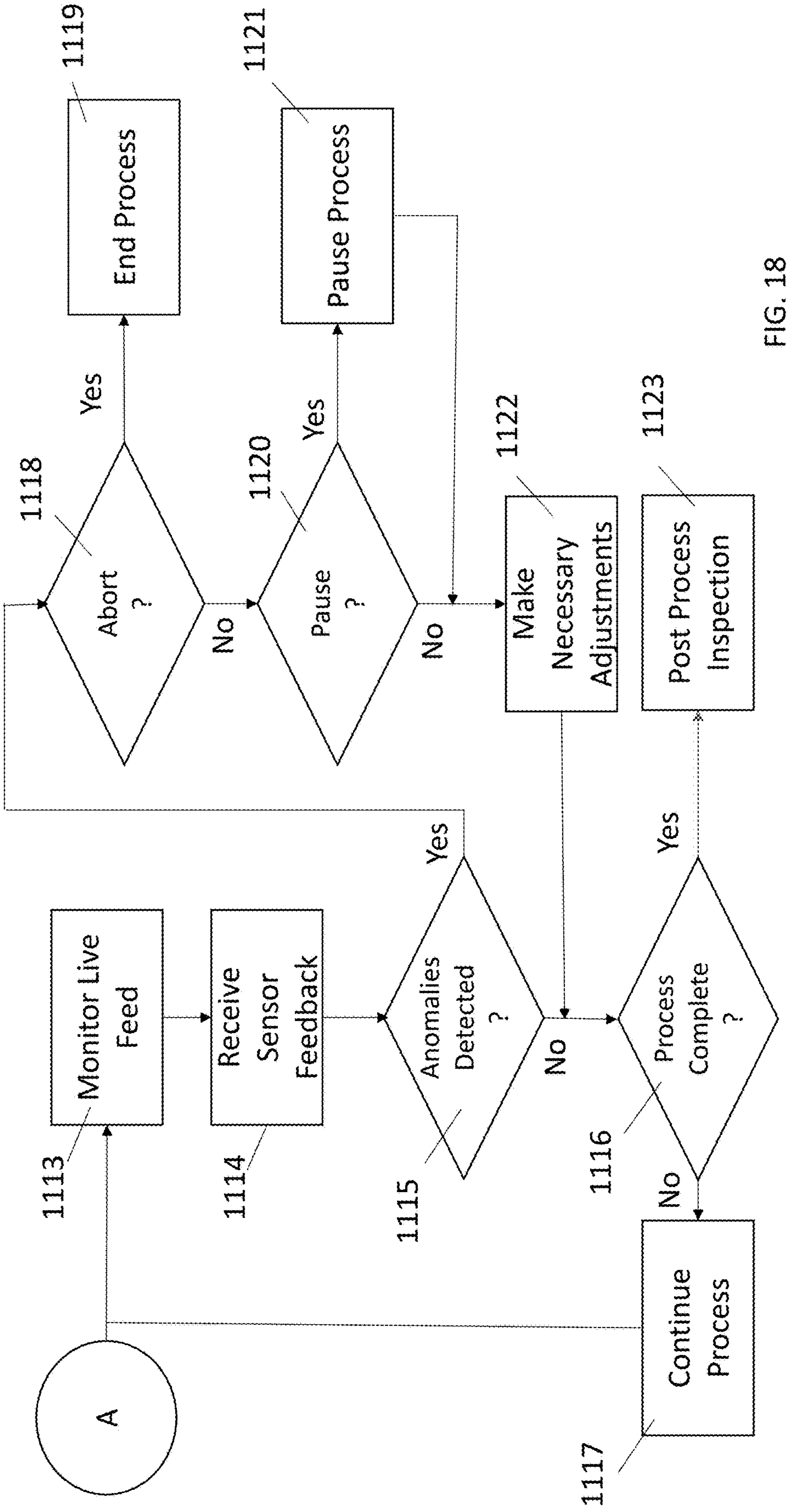

With reference to FIGS. 17 and 18, there is shown an exemplary process 1100 which comprises a high-level description of the method of use of an operator augmented reality system. At 1101, the robot with the cutting tool navigates to the first service location. At 1102, the relevant frames of reference are established. At 1103, RGB video images and IR images are transmitted from the robot sensors to the display to create an augmented reality image 1104. In one embodiment, the augmented reality image 1104 is superimposed on a video monitor observable by the operator. The augmented reality image 1104 can be, for example, the shape and location of a service opening into the host pipe. At 1105, the display, using an augmented reality image, displays the target and the cut path. In some embodiments, the operator selects the cutting path from a predetermined roster of cutting paths. A series of steps may ensue, for example, at 1106, it is determined whether the cutting process is ready to be initiated. If not, any adjustments are made at 1107 and the process continues with the same inquiry at 1106. If the processes are ready, the determination is made as to whether the cutting process should be fully automatic at 1108 and 1109, semi-automatic at 1110 and 1112 or a manual process at 1112. Particularly when the manual process 1112 is used, a control is provided that allows the operator to adjust the transparency of the augmented reality image 1104 superimposed on the monitor so that it appears to be on the liner in the host pipe. Increasing transparency can be useful to the operator when manual cuts are made. It is also envisioned that the transparency of the augmented reality image 1104 can be controlled by a controller.

Continuing at Point A, a live feed of the cut is provided to a display monitor at 1113. Real time sensor feedback is received at 1114. At 1115, there is a determination as to whether any anomalies related to the cut were detected. An example of an anomaly is that the measured feed rate for cutting does not match the predicted feed rate for cutting. If no anomalies are detected, then an inquiry as to whether the process is complete at 1116. If not, the process continues at 1117. If the process is complete at 1116 then a post process inspection is performed at 1123.

However, if there were anomalies detected at 1115, there is a decision point at 1118 as to whether to abort the process. If yes, the process is ended at 1119. If no abort process is needed, there is a determination as to whether to pause the process at 1120 and the process is paused at 1121. Regardless of whether the process is paused, any necessary or desired adjustments are performed at 1112 and the process continues as shown in FIG. 11*b*.

Figure 19:
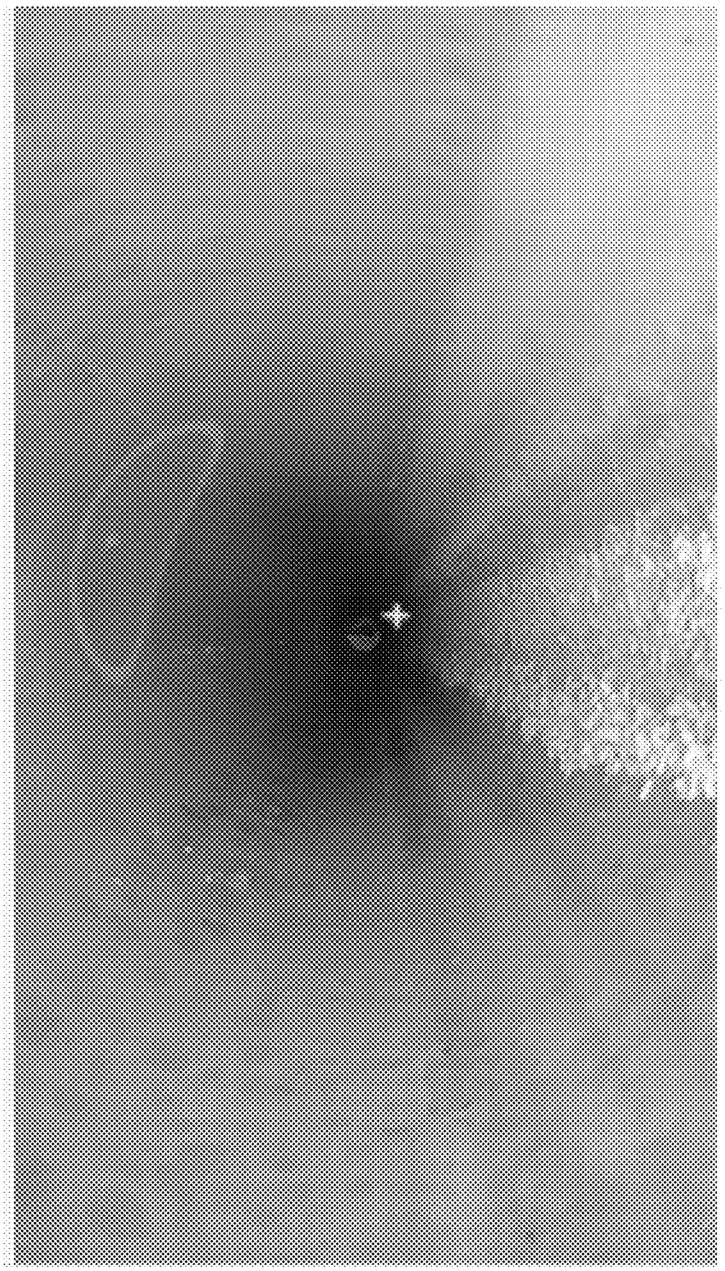
FIG. 19 is an exemplary photograph of an augmented reality operator display.

As described in a high level above, the cutting path and boundaries of the service to be cut may be augmented to be display as an overlay on a 2D image from the live video feed as shown in FIG. 19. This will allow the operator to observe the predicted and detected location of the service. Without the augmented overlay the only information the operator would have been the visual information from the camera. The augmented display of the service may contain confidence information to denote the safety margin of the cutting path as well as the calculated likelihood the sensors are correctly localized the service within the map.

Figure 20:
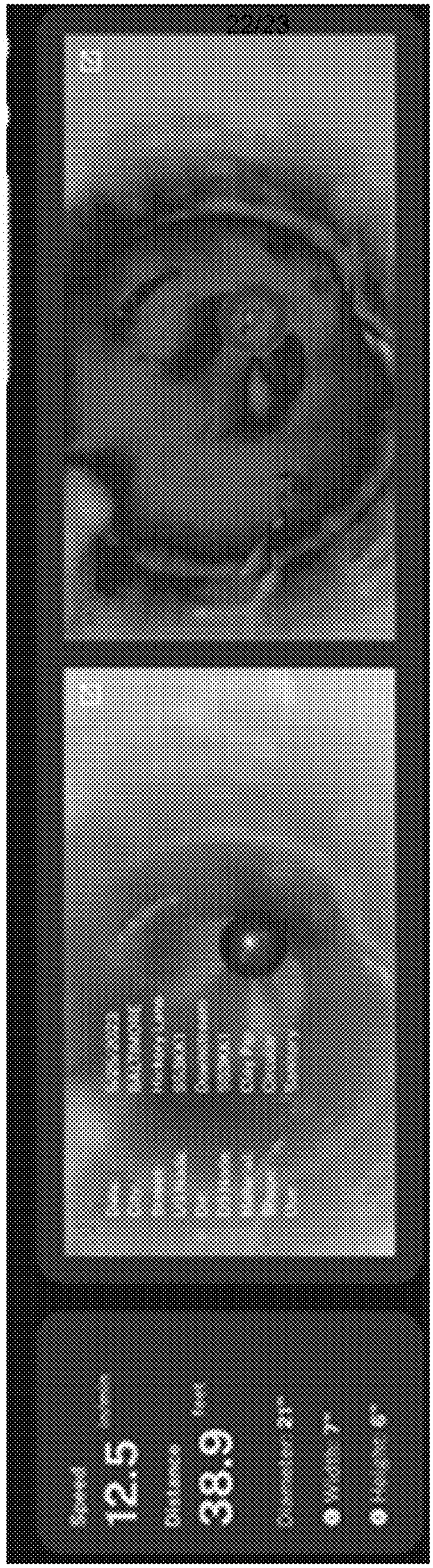
FIG. 20 is an example of an operator display.

FIG. 20 shows another example view of an operator display while the robot is traversing a pipe. In this example, the speed of the robot and the distance traveled by the robot is shown on the left. The black and white photograph on the left shows a digital map of the interior of the pipe, while the color photograph on the right is the digital map highlighting the IR outputs in which the various colors show the gradient in temperatures within the field of view.

During the cutting process, the sensors may provide actionable feedback as follows:

The encoder on each joint may provide some measure of forward or backward linear motion.

The IMU may provide feedback with respect to the rotation an orientation of rigid bodies within the scan frame of reference. For example, the frame of reference may be the robot frame of reference (activity at the base of the robot), the sensor scan of reference (the direction the camera is aimed); and the tool frame of reference (i.e., the cutting bit).

Acceleration may be calculated to indicate whether the robot is tipping, shaking, moving or stuck.

Live RGB camera feeds provide video and augmented reality views of the environment.

IR cameras provide thermal mapping to detect and confirm what may lie in openings beyond the liner or pipe material. An IR image may be overlaid on the digital image and the RGB camera feed as further augmented reality images. The operator and or the artificial intelligent system may have the capability to tune the temperature ranges that the IR camera uses in its processing. Such fine tuning may enhance the contrast to enable better detection of the service locations. For example, underground temperatures will be significantly different in Phoenix, AZ than they would be in Minneapolis, MN which would create vastly different thermal images. Steam cured pipes may have different thermal characteristics than water cured pipes which maybe deferent than UV-cured pipes. In addition to having the operator fine tune the thermal ranges, such adjustments may also be made automatically by training the system.

Figure 21:
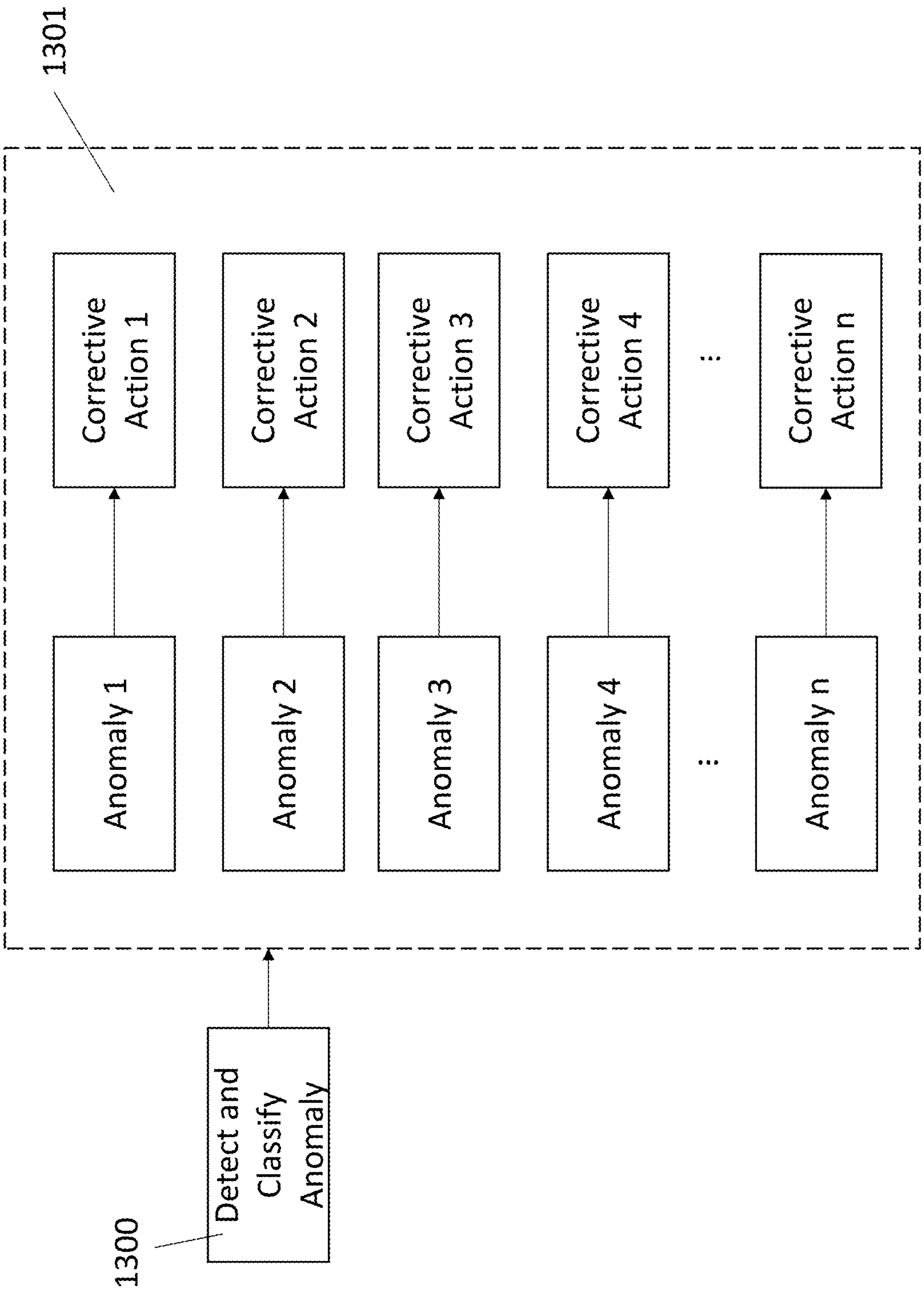
FIG. 21 is an example flow diagram showing the anomalies which may be encountered during a cutting operation and the corrective action to be taken.

FIG. 21 shows an exemplary simplified block diagram which shows the detection and classification of an anomaly at 1300 and the corrective action taken at 1301. While FIG. 21 shows each anomaly has a corresponding corrective action, in reality, each anomaly may be mapped to more than one corrective action and multiple anomalies may be mapped to a single corrective action.

When unexpected conditions arise there are many possible actions that are available either automatically or through operator assistance. The actions will include but are not limited to the following. The robot may attempt to reverse the direction of motion. The robot may stop all joints and move towards the safe coordinate. This safe coordinate can be calibrated or adjusted, but a preferred embodiment would be a point which is in the center of the pipe. The robot may present a warning to the operator and require manual intervention before proceeding with automated motion.

It is possible there are more complex situations of detected conditions. It is possible the robot is stuck on one joint, but that reaction may be caused by motion of another joint. This can occur if the cutting bit is raised up and collides with the wall and catches as the forward motion of the robot gets stuck. The robot may utilize a calibrated set of actions or may have a deep learning or other machine learning method to adapt the motion based upon the current inputs. The corrective action plan can dynamically be adjusted to attempt the most likely to succeed resolution step based upon the current sensor inputs and the history of previous actions. The system will also subsequently record all corrective action steps across the fleet so that the learning from one system may directly be applied to another system so that the same failures do not need to be repeated.

One feedback method may include monitoring the motor current flowing from the joint motors and detecting whether there is an unexpected change in the current. A sudden spike in current may mean the robot has accidentally collided with something or is stuck on something. When this is detected, the system can stop the motion, and take corrective action.

Another feedback method will be to monitor the IMU sensors for the orientation of all the joints in the robot. If the IMU detects the robot is tilting or tipping unexpectedly then the currently planned path may not be optimal based upon the changes in the environment. If the IMU detects unexpected motion the robot system may take one of the possible corrective action plans.

Another feedback will detect slippage of motion. As there may be water, cracks or other obstacles in the system the wheeled motion may not always result in forward motion. When the slippage is detected the robot system will take corrective action. If the wheel encoders are changing, but the IMU or other sensors are reporting no change in position, then the wheel(s) are slipping. The robot may take one of the possible corrective actions.

The feedback and controls of the robotic system will operate on device with real time operations. This means that as the robot is moving within the environment the sensor data will be processed, the motion will be calculated and the corrective action will be executed in real time. That will ensure the robot adjusts and reactions which will prevent damage and will operate efficiently.

Artificial Intelligence Algorithms. The sensor data collected may be collected and analyzed in real time by the edge device or by the sensor fusion network 27. A variety of AI algorithms may be used for processing the sensor data. By way of example only, data from a single sensor, an autoregressive integrated moving average ("ARIMA"), a statistical analysis model that uses time series data to either better understand the data set or to predict future trends, may be used to analyze single sensor data. In another embodiment, long short-term memory (LSTM) network, a recurrent neural network (RNN) may be used to analyze single sensor or multiple sensor inputs. For mode detection, Gaussian Distribution models may be used.

For anomaly detection, AI algorithms may include Multi-Scale Convolutional Recurrent Encoder-Decoder (MSCRED), Local Outlier Factor (LOF), or Model Autophagy Disorder (MAD), each of which may be used to perform anomaly detection and diagnosis in multivariate time series data.

In each case, after the AI models are trained, inputs to the AI algorithms may be a sequence of sensor data for the immediately preceding time period, which may, for example, be measured in seconds or minutes or longer, and the output of the AI algorithms may be a sequence of predicted data for a future time period.

Aspects of the Disclosure. The following are various exemplary and non-limiting aspects of the present disclosure.

Aspect Set A. Robot with Sensor Package Including IMU and Lidar

Aspect 1. A robot sized and shaped for reception in a pipe, the robot including a chassis configured for movement of the robot on the pipe, a tool supported by the chassis for movement relative to the chassis, a plurality of sensors including an inertial measurement unit (IMU), an encoder and a light detection and ranging sensor (LIDAR) associated with the robot, and a sensor fusion system operable to combine readings from the IMU, the encoder and LIDAR to determine a position of the robot within the pipe.

Aspect 2. The robot of aspect 1 wherein the sensor fusion system is operable to use machine learning in determination of the robot position.

Aspect 3. The robot of aspect 2 wherein the plurality of sensors further includes a two-dimensional camera and the sensor fusion system is operable to map an inside of the pipe.

Aspect 4. The robot of aspect 3 wherein the sensor fusion system associates video data from the two-dimensional camera with the robot position to map the inside of the pipe.

Aspect 5. The robot of aspect 2 wherein the sensor fusion system is operable to resolve discrepancies in data received from the IMU and the encoder to determine the position of the robot within the pipe.

Aspect 6. The robot of aspect 1 wherein the encoder is configured to measure a distance traveled by a tether attached to the robot.

Aspect 7. A robot sized and shaped for reception in a pipe, the robot including a chassis configured for movement of the robot in the pipe, wheels connected to the chassis for movement of the robot relative to the pipe, a plurality of sensors including an inertial measurement unit (IMU), an encoder and a light detection and ranging (LIDAR) sensor associated with the robot, and a sensor fusion system operable to combine readings from the IMU, the encoder and LIDAR to create a digital map of the interior of the pipe.

Aspect 8. The robot of aspect 7 further including a two-dimensional camera and wherein the sensor fusion system is operable to combine three-dimensional data from the LIDAR sensor and two-dimensional data from the camera to map the interior of the pipe.

Aspect 9. The robot of aspect 8 further including an infrared camera configured to detect relative temperatures associated with the interior of the pipe and an exterior of the pipe.

Aspect 10. A robot configured to traverse an environment, the robot including a chassis having a plurality of wheels configured for rotational movement relative to the chassis, the wheels further including an encoder configured to determine a distance traveled by the wheels relative to the environment, a plurality of sensors associated with the robot configured to traverse the environment with the robot and further configured to sense data in real time while the robot is traversing the environment, and a sensor fusion system operable to combine readings from the plurality of sensors to create a digital map of the environment.

Aspect 11. The robot of aspect 10 wherein a first of the plurality of the sensors is a 2-dimensional camera and a second of the plurality of the sensors is a light detection and ranging (LIDAR) sensor configured to generate a 3-dimensional image and wherein the sensor fusion system is operable to calculate a first frame of reference for the 2-dimensional camera and a second frame of reference for the LIDAR sensor and combine outputs from the 2-dimensional camera and the LIDAR sensor adjusted based on the first frame of reference and the second frame of reference to create the digital map.

Aspect 12. The robot of aspect 11 wherein a third of the plurality of the sensors is a Inertial Measurement Unit (IMU) and the sensor fusion system is operable to refine dimensions associated with the digital map.

Aspect 13. The robot of aspect 12 wherein a fourth of the plurality of the sensors is an infrared camera and wherein the digital map is created with an added heat signature of the environment at different points in the environment based on the infrared camera.

Aspect 14. The robot of aspect 13 wherein the heat signature is indicative of an element of the environment that is not visible by the 2-dimensional camera or the LIDAR sensor.

Aspect 15. The robot of aspect 10 wherein the sensor fusion system is further operable to control operation of the plurality of the sensors.

Aspect 16. The robot of aspect 10 wherein one of the plurality of sensors is an Inertial Measurement Unit (IMU) and the IMU is mounted on an articulated arm attached to the robot.

Aspect 17. The robot of aspect 16 wherein the sensor fusion system is further operable to control movement of the articulated arm.

Aspect 18. The robot of aspect 17 wherein the sensor fusion system is further operable to calculate a frame of reference associated with the articulated arm based on sensor data from the IMU.

Aspect 19. The robot of aspect 10 further including a tool and wherein the sensor fusion system is operable to control use of the tool.

Aspect 20. The robot of aspect 19 wherein the robot is configured to traverse the environment and position the tool at a predetermined point in the environment based on the digital map.

Aspect 21. The robot of aspect 20 wherein a first of the plurality of the sensors is a 2-dimensional camera and a second of the plurality of the sensors is a light detection and ranging (LIDAR) sensor configured to generate a 3-dimensional image and wherein the sensor fusion system is operable to calculate a first frame of reference for the 2-dimensional camera and a second frame of reference for the LIDAR sensor and combine outputs from the 2-dimensional camera and the LIDAR sensor adjusted based on the first frame of reference and the second frame of reference to create the digital map showing the predetermined point.

Aspect Set B. Real Time Feedback Loop for Multi-sensor Applications

Aspect 1. A method, including assessing, by a robot, a feature of an environment based on data from one of the plurality of sensors, wherein the robot is positioned in the environment, comparing, by the robot, the feature of the environment to an expected feature of the environment, creating, by the robot, a feedback loop based on the comparing step, and adjusting an operational condition of the robot based on the feedback loop.

Aspect 2. The method of aspect 1 wherein the sensor is an inertial measurement unit (IMU) and the feedback loop includes a measurement of vibration.

Aspect 3. The method of aspect 2 wherein the adjusting step includes adjusting the speed of an attached motor and wherein a characteristic of the feature is a hardness of the feature.

Aspect 4. The method of aspect 1 wherein one or more of the plurality of sensors is a current sensor and wherein the feedback loop includes a spike in a current measurement.

Aspect 5. The method of aspect 4 wherein the adjusting step includes adjusting a speed of an attached motor and wherein a characteristic of the feature is a hardness of the feature.

Aspect 6. The method of aspect 1 wherein one or more of the plurality of sensors determine a rotational speed of an attached motor and wherein the method further includes comparing the rotational speed of the motor to an expected rotational speed of the motor.

Aspect 7. The method of aspect 6 further including determining a characteristic of the feature and wherein the characteristic is a hardness of the feature and wherein the adjusting step is changing the rotational speed of the motor.

Aspect 8. The method of aspect 1 wherein the plurality of sensors includes one or more joint encoders configured to encode a pose of an articulated portion of the robot and wherein the feedback loop includes a change in the pose of the articulated portion of the robot.

Aspect 9. The method of aspect 1 wherein the sensor is an inertial measurement unit (IMU) and the feedback loop includes a measurement of vibration.

Aspect 10. The method of aspect 9 wherein the adjusting step includes adjusting the pose of the robot to smooth out the vibration.

Aspect 11. The method of aspect 9 further including determining that the vibration is based on a material property within the environment and the adjusting step includes adjusting a speed of a motor attached to the robot.

Aspect 12. The method of aspect 1 wherein the feature is a material property associated with the environment.

Aspect 13. The method of aspect 12 wherein the material property is hardness of a material forming a portion of the environment.

Aspect 14. The method of aspect 1 further including traversing, by the robot, the environment and wherein the feedback loop is based on sensed changes in the environment.

Aspect 15. The method of aspect 1 wherein the expected feature of the environment is based on a probability of the expected feature using a machine learning algorithm.

Aspect 16. The method of aspect 1 wherein the expected feature of the environment is pre-determined and the comparing step is performed using a machine learning algorithm.

Aspect 17. The method of aspect 1 wherein the feedback loop is configured to provide an input into a machine learning algorithm.

Aspect 18. The method of aspect 18 wherein the feedback loop is configured to further train the machine learning algorithm.

Aspect Set C. Automatic Adjustment of Robot Frame of Reference

Aspect 1. A method of controlling movement of a robot in an environment, wherein the robot has a plurality of sensors associated therewith, the method including determining an initial scan frame of reference for the robot, wherein scan frame of reference is calculated based on an initial point of origin, calculating a new point of origin based on a reading from at least one of the sensors, and adjusting the initial scan frame of reference to determine a new scan frame of reference based on the new point of origin, wherein the adjusting step is based on the difference between the initial scan frame of reference and the new scan frame of reference.

Aspect 2. The method of aspect 1 wherein the initial scan frame of reference for the robot includes an initial scan frame of reference for each of the plurality of sensors based on a pose of each of the plurality of sensors, and wherein the adjusting step includes adjusting the initial scan frame of reference for each of the plurality of sensors to a new scan frame of reference for each of the plurality of sensors.

Aspect 3. The method of aspect 2 further including calculating a correction factor and wherein adjusting step includes applying the correction factor to calculate the new scan frame of reference for each of the plurality of sensors.

Aspect 4. The method of aspect 1 wherein the environment is modified and the step of calculating a new point of origin is initiated by the modification of the environment.

Aspect 5. The method of aspect 1 wherein the at least one of the sensors is an inertial measurement unit (IMU) and wherein the IMU calculates the new point of origin based on the IMU's position within the environment.

Aspect 6. The method of aspect 5 wherein the IMU calculates the new point of origin while traversing the environment.

Aspect 7. The method of aspect 6 further including calculating a correction factor based on the differences between the initial point of origin and the new point of origin.

Aspect 8. The method of aspect 7 wherein the robot is moving within the modified environment and the robot calculates a distance that would have been traveled in the environment using the correction factor.

Aspect 9. The method of aspect 8 wherein the IMU is used to calculate the distance.

Aspect 10. The method of aspect 8 wherein a motor encoder is used to calculate the distance.

Aspect 11. The method of aspect 7 further including a table comparing an original distance in an environment to a modified distance in the modified environment based on the correction factor.

Aspect 12. The method of aspect 7 wherein the robot uses machine learning for the assimilation and initiating steps.

Aspect 13. The method of aspect 1 wherein the robot is configured to (1) assimilate data from the plurality of sensors and (2) initiate the adjusting step based on the assimilation of data.

Aspect 14. A method of controlling movement of a robot in a modified environment, wherein the modified environment is based on an original environment, including scanning the modified environment using a scanning device while the robot is traversing the modified environment, monitoring a position of the scanning device in the modified environment with respect to a reference from of the original environment, periodically adjusting a reference frame of the scanning device relative to the reference frame of the original environment according to the monitored position of the scanning device.

Aspect 15. The method of aspect 13 wherein the periodically adjusting the reference frame includes adjustment based on a size difference between the original environment and the modified environment.

Aspect 16. The method of aspect 15 wherein the original environment is a pipe and the modified environment is a liner placed within the pipe.

Aspect 17. A method of fusing sensor data associated with a robot in an environment, wherein the robot has a plurality of sensors associated therewith, the method including determining an initial scan frame of reference for the robot, wherein scan frame of reference is based on an initial pose of the robot, determining an initial sensor frame of reference for each of the plurality of sensors, wherein the initial sensor frames of reference are based on respective initial poses of each of the plurality of sensors, establishing a new point of origin which modifies the initial pose of the robot and the respective initial poses of each of the plurality of sensors, calculating updated frames of references based on a difference between the initial pose of the robot and the modified pose of the robot and a difference between the respective initial poses of each of the plurality of sensors and the modified respected poses of each of the plurality of sensors, and fusing sensor data based on the calculating step.

Aspect 18. The method of aspect 17 wherein the initial frame of reference of the robot is based on an initial environment being traversed by the robot and the updated frame of the robot is based on a modified environment, wherein the modified environment has at least one different dimensional measurement than the initial environment.

Aspect 19. The method of aspect 18 wherein the initial environment is a pipe and the modified environment is a liner placed within the pipe, and wherein the different dimensional measurement is a changed radius of the pipe.

Aspect Set D. Autonomously Driving by a Robot Using a Digital Map

Aspect 1. A method including creating a digital map of an environment, loading the digital map on a moveable robot, wherein the robot is placed in the environment, generating a trajectory path plan from a current position to a desired position using the digital map, the trajectory path having a plurality of waypoints, causing the robot to traverse within the environment in accordance with the trajectory path plan, collecting sensor data in real time while the robot is traversing within the environment, detecting, based on the collecting step, at each waypoint, whether an anomaly is present between an existing waypoint and a subsequent waypoint, performing a corrective action of the robot based on the detecting step.

Aspect 2. The method of aspect 1 wherein the anomaly is one of a crack or a bump on a surface in the environment.

Aspect 3. The method of aspect 2 wherein the corrective action is to slow a speed of the robot until the robot navigates from a current waypoint to a subsequent waypoint.

Aspect 4. The method of aspect 3 wherein the sensor data includes motion data from one of an IMU or a motor encoder and the speed is adjusted based on the motion data.

Aspect 5. The method of aspect 1 wherein the anomaly is a blockage and the corrective action is to reverse a direction of the robot from the current waypoint to a previous waypoint.

Aspect 6. The method of aspect 1 wherein the anomaly is water within the environment.

Aspect 7. The method of aspect 6 further including assessing whether robot is able to navigate through the water and performing a corrective action is based on the assessing step.

Aspect 8. The method of aspect 1 wherein the moveable robot traverses the environment autonomously.

Aspect 9. The method of aspect 1 wherein the environment is modified after the digital map is created and the sensor data is used to create a second digital map based on the modification.

Aspect 10. The method of aspect 9 wherein the digital map is created based on a first scan of reference of the robot and the second digital map is created based on a second frame of reference of the robot.

Aspect 11. The method of aspect 10 wherein the environment is an inside of a pipe and the modification is inserting a liner within the pipe.

Aspect 12. The method of aspect 9 wherein an adaptive machine learning approach is used to create the second digital map based on the digital map.

Aspect 13. A method of performing operations with a robot in a pipe, the pipe having a liner installed therein, the method including causing the robot to move through the lined pipe according to a predetermined plan of movement, sensing a condition in the lined pipe using sensors associated with the robot, determining whether the sensed condition require a change in movement of the robot in the lined pipe, and automatically changing the movement of the robot in the main pipe if a determination is made that the sensed condition requires the change.

Aspect 14. The method of aspect 13 wherein automatically changing the movement of the vehicle includes changing at least one of the speed of the vehicle or the orientation of the vehicle.

Aspect 15. The method of aspect 13 further including referencing a digital map of the pipe made prior to insertion of the liner wherein the predetermined plan of movement is based on the digital map.

Aspect 16. The method of aspect 15 further including creating a second digital map of the pipe after the insertion of the liner while the robot is moving within the lined pipe.

Aspect 17. The method of aspect 16 further including determining the difference between the digital map and the second digital map, wherein the difference is used to adjust the movement of the robot within the lined pipe.

Aspect 18. The method of aspect 13 wherein the sensed condition is based on sensor data received from an inertia measurement unit (IMU), two dimensional cameras, and LIDAR and wherein the change is based on the sensor data.

Aspect 19. The method of aspect 18 wherein adaptive machine learning techniques are used to adjust the movement of the robot after the liner is installed.

Aspect Set E. Control of Robot Tool in Space-Constrained Environment

Aspect 1. A method of controlling a tool carried by a robot in a main pipe where the tool is operable to extend into a branch conduit extending from the main pipe, the method including moving the robot to a location in the main pipe corresponding to a branch conduit opening location where the branch conduit opens into the main pipe by referencing a digital map of the main pipe, extending the tool from the robot toward the branch conduit opening at an angle corresponding to an angle the branch conduit makes with the main pipe so as to reduce the likelihood of contact of the tool with a wall of the branch conduit.

Aspect 2. The method of aspect 1 wherein extending the tool from the robot includes extending the tool at an angled generally equal to the angle the branch conduit makes with the main pipe.

Aspect 3. The method of aspect 2 wherein moving the robot further includes positioning the robot in relation to the branch conduit opening as a function of the angle the branch conduit makes with the main pipe.

Aspect 4. The method of aspect 3 further including performing a first scan of the main pipe to create the digital map, and then lining the main pipe with a liner.

Aspect 5. The method of aspect 4 further including cutting the liner in the main pipe with the tool to re-establish fluid communication of the branch conduit with the main pipe through the branch conduit opening.

Aspect 6. The method of aspect 1 wherein moving the robot further includes positioning the robot in relation to the branch conduit opening as a function of the angle the branch conduit makes with the main pipe.

Aspect 7. The method of aspect 1 further including performing a first scan of the main pipe to create the digital map, and then lining the main pipe with a liner.

Aspect 8. The method of aspect 7 further including cutting the liner in the main pipe with the tool to re-establish fluid communication of the branch conduit with the main pipe through the branch conduit opening.

Aspect 9. A robot system for operating in a main pipe, the robot including a body configured to be moved within the lined main pipe along the length of the main pipe, a tool mounted on the body for movement with respect to the body to perform an operation within the lined main pipe, a controller operatively connected to the body and the tool for controlling movement of the tool, the controller being configured to reference a digital map of the main pipe containing information regarding the intersection of the branch conduit with the main pipe to control the angle at which the tool is extended from the main pipe thereby to avoid contact with a wall of the branch conduit.

Aspect 10. The robot of aspect 9 wherein the tool is a cutting tool configured for cutting into a liner lining the interior of the main pipe.

Aspect 11. The robot of aspect 9 further including an arm supported by the body and mounting the tool, the arm being movable with respect to the body.

Aspect 12. The robot of aspect 11 wherein the arm has a joint connecting the arm to the body, the robot further including a motor for driving movement of the arm at the joint.

Aspect 13. The robot of aspect 12 wherein the joint includes an encoder for tracking movement of the arm.

Aspect 14. The robot of aspect 12 wherein the motor is an electric motor, the robot further including a current sensor for detecting the current drawn by the motor.

Aspect 15. The robot of aspect 14 wherein the controller is operatively connected to the current sensor for receiving data from the sensor.

Aspect 16. The robot of aspect 15 wherein the controller is configured to stop movement of the arm when the detected current exceeds a threshold.

Aspect 17. The robot of aspect 9 further including a display, and wherein the controller causes information concerning the angle of the branch conduit relative to the main pipe to appear on the display.

Aspect Set F. Operator-Assisted Re-Establishment of Fluid Communication in Lined Pipe Aspect 1. A method of locating a branch conduit opening into a main pipe following lining the main pipe with a liner, the method including moving a robot down the lined main pipe, transmitting visual images of the liner in the main pipe from a camera associated with the robot to a monitor outside of the main pipe for viewing by a human operator, displaying, on the monitor, an interior view of the lined main pipe from the transmitted visual images, superimposing on the interior view displayed on the monitor an image representing the location of the branch conduit opening so that the image appears on the monitor to be located on the liner as shown in the interior view.

Aspect 2. The method of aspect 1 wherein superimposing the image includes superimposing information regarding the confidence level of the superimposed image representing the location of the branch conduit opening.

Aspect 3. The method of aspect 1 further including executing an override command responsive to intervening by the human operator to affect operation of the robot.

Aspect 4. The method of aspect 1 further including monitoring with sensors located in the lined main pipe the position of the robot in the lined main pipe and adjusting the superimposition of the image in response to the detected location.

Aspect 5. The method of aspect 1 wherein the operator selects from a menu a cutting path of a cutting tool supported by the robot for cutting the liner.

Aspect 6. The method of aspect 1 further including providing infrared image data of the liner in the main pipe.

Aspect 7. The method of aspect 6 further including adjusting ranges of infrared image data that is used to locate a feature in the main pipe.

Aspect 8. The method of aspect 1 further including adjusting the transparency of the superimposed image.

Aspect 9. A system for re-establishing fluid communication between a branch conduit and a main pipe following lining of the main pipe with a liner, the system including a robot configured for moving inside the lined main pipe, a cutting tool supported by the robot for cutting the liner to re-establish fluid communication between the branch conduit and the main pipe, a sensor supported by the robot for acquiring image data of the lined main pipe as the robot moves inside the main pipe, the sensor being configured to transmit the image data, a controller operatively connected to the sensor for receiving the image data, a display operatively connected to the controller for receiving and displaying an interior view of the main pipe based on the image data from the sensor, wherein the controller is configured to superimpose onto the interior view based on the image data from the sensor, an image of an opening of the branch conduit into the main pipe at a location on the liner determined by the controller to be a location of the branch conduit opening.

Aspect 10. The system of aspect 9 wherein the controller determines a confidence level associated with the determined location of the branch conduit opening and causes the confidence level to appear on the display.

Aspect 11. The system of aspect 9 wherein the controller is operatively connected to the robot for controlling the robot.

Aspect 12. The system of aspect 11 wherein the controller is configured to receive inputs from the human operator for direct control of the robot by the human operator.

Aspect 13. The system of aspect 12 wherein the controller is configured to analyze the image data and to determine the presence of an anomalous condition in the lined main pipe, and to provide a warning via the display of the presence of the anomalous condition.

Aspect 14. The system of aspect 9 further including sensors associated with the robot for scanning the lined main pipe as the robot moves inside, the sensors being connected to the controller for providing sensor data used by the controller to determine a location of the robot in the lined main pipe.

Aspect 15. The system of aspect 14 wherein the controller is configured to adjust the image superimposed on the display according to the location of the robot.

Aspect 16. The system of aspect 9 wherein the controller is configured to cause a menu of cutting paths for the cutting tool to be shown on the display for selection by the operator to control movement of the cutting tool to cut the liner.

Aspect 17. The system of aspect 9 wherein one of the sensors is an infrared sensor configured to provide infrared image data to the controller.

Aspect 18. The system of aspect 17 wherein the controller is responsive to user input to adjust the ranges of the infrared image data used to locate a feature in the main pipe.

Aspect 19. The system of aspect 9 further including a transparency selector for selecting the transparency of the image of the opening of the branch conduit.

Aspect 20. The system of aspect 19 wherein the transparency selector is disposed for actuating by the operator.

Aspect Set G. Control of Cutting to Re-Establish Fluid Communication in a Lined Pipe Aspect 1. A method of re-establishing fluid communication between a main pipe and a branch conduit extending from the main pipe following lining of the main pipe with a liner, the method including moving a robot supporting a cutting tool down the lined main pipe to a location proximate to the branch conduit, the cutting tool being selectively extendable from the robot for cutting the liner, extending the cutting tool from the robot toward the liner at a location where the branch conduit has an opening into the main pipe on an opposite side of the liner, cutting the liner at the location with the cutting tool, and monitoring the cutting during said step of cutting the liner and adjusting the operation of the cutting based on information acquired by monitoring the cutting tool.

Aspect 2. The method of aspect 1 wherein said step of monitoring the cutting tool includes monitoring at least one of: (a) the current draw of a motor powering the cutting tool, (b) the current draw of a motor driving extension of the cutting tool, (c) the temperature of the liner at the location of cutting, and (d) a position of the robot relative to the location of the branch conduit.

Aspect 3. The method of aspect 1 further including predicting the resistance of the liner to cutting based on data received by a controller of the cutting tool.

Aspect 4. The method of aspect 3 wherein the data received by the controller of the cutting tool includes at least one of: (a) the material of the liner, (b) the thickness of the liner, (c) curing parameters of the liner.

Aspect 5. The method of aspect 4 wherein the diameter of an opening in the liner to be cut by the cutting tool is selected based on at least one of the material of the liner, the thickness of the liner and the curing parameters of the liner.

Aspect 6. The method of aspect 3 wherein predicting the resistance includes executing a machine learning model.

Aspect 7. A system for re-establishing fluid communication between a main pipe and a branch conduit extending from the main pipe following lining of the main pipe with a liner, the system including a robot sized and shaped for being received in and movable down the main pipe, a cutting tool supported by the robot and mounted on an extender configured to move the cutting tool away from and toward the robot, the extender including an electric motor, one or more sensors supported by the robot and operable to detect the environment in which the robot is positioned, a controller operatively connected to the robot, the cutting tool and the sensors, the controller being configured to position the robot in the lined main pipe proximate to the branch conduit and to extend the cutting tool from the robot toward the liner at a location where the branch conduit has an opening into the main pipe on an opposite side of the liner to cut the liner with the cutting tool, the controller being further configured to active the one or more sensors to monitor the cutting while the cutting tool is activated to cut the liner and to adjust the operation of the cutting based on information acquired by monitoring the cutting tool.

Aspect 8. The system of aspect 7 wherein the at least one sensor includes at least one of the following: a sensor for monitoring the current draw of a motor powering the cutting tool, a sensor measuring the current draw of the electric motor of the extender, a sensor for measuring the temperature of the liner at the location of cutting, and a sensor for detecting position of the robot relative to the location of the branch conduit.

Aspect 9. The system of aspect 7 wherein the controller is programmed to predict the resistance of the liner to cutting based on data received by the controller.

Aspect 10. The system of aspect 9 wherein the controller is configured to receive input including at least one of: (a) the material of the liner, (b) the thickness of the liner, (c) curing parameters of the liner.

Aspect 11. The system of aspect 9 further including a machined learned model, wherein the controller executes the machine learned model to predict the resistance.

Aspect 12. A method of re-establishing fluid communication between a main pipe and a branch conduit extending from the main pipe following lining of the main pipe with a liner, the method including positioning a robot supporting a cutting tool in the lined main pipe proximate to the branch conduit, the cutting tool being selectively extendable from the robot for cutting the liner, extending a cutting tool from the robot toward the liner at a location where the branch conduit has an opening into the main pipe on an opposite side of the liner, cutting the liner with the cutting tool, and controlling said cutting using inputs including at least one of a material of the liner, a resin used to cure the liner and wear of the cutting tool.

Aspect 13. The method of aspect 12 wherein said step of controlling said cutting includes basing the dimensions of the opening to be cut at least in part on at least one of the input of the material of the liner, the resin used to cure the liner and the wear of the cutting tool.

Aspect 14. The method of aspect 12 wherein said step of cutting the liner includes moving the cutting tool in a spiral path.

Aspect 15. The method of aspect 13 wherein said step of cutting the liner includes moving the cutting tool in a zig zag path.

Aspect 16. The method of aspect 12 wherein the inputs are provided on a drop-down menu.

Aspect Set H. Locating Branch Conduits in Lined Pipe

Aspect 1. A method of locating a branch conduit opening into a main pipe following lining the main pipe with a liner, the method including moving a robot down the lined main pipe, scanning the liner using an infrared scanner mounted on the robot, sensing with the infrared scanner a temperature drop outside the liner as compared to the adjacent surfaces to acquire infrared data, comparing the infrared data with other location data regarding the branch conduit opening and determining a branch conduit opening location outside of the liner based on the infrared data and the other data.

Aspect 2. The method of aspect 1 wherein said step of comparing the infrared data with other location data, includes comparing the infrared data with a digital map of the main pipe.

Aspect 3. The method of aspect 1 wherein said step of detecting the branch conduit opening includes segregating infrared data acquired by the infrared scanner in said step of scanning the liner using an infrared scanner by ranges representing the highest and lowest temperatures expected to be found and infrared data outside those ranges is ignored for said step of detecting the branch conduit opening.

Aspect 4. The method of aspect 3 further including selectively tuning the infrared scanner ranges.

Aspect 5. The method of aspect 1 wherein said step of detecting the branch conduit opening includes using software to look for circular features and determine deviations from circular features in the data acquired in the scan.

Aspect 6. The method of aspect 1 further including assigning a confidence score to the detected branch conduit opening.

Aspect 7. The method of aspect 6 wherein the confidence score is changed in an iterative process for locating the branch conduit opening.

Aspect 8. A system for locating a branch conduit opening into a main pipe following lining the main pipe with a liner, the system including a robot, an infrared scanner supported on the robot and a controller for receiving data from the scanner and controlling operation of the robot and the infrared scanner, the controller being configured to cause the robot to move down the lined main pipe, and simultaneously activate the infrared sensor to scan the liner, the controller being programmed to detect the branch conduit opening outside of the liner by sensing with the infrared scanner a temperature drop outside the liner as compared to the adjacent surfaces, to compare the location of the branch conduit opening indicated by the infrared sensor scan with other data regarding the location of the branch conduit opening.

Aspect 9. The system of aspect 8 wherein the controller is programmed to compare the location of the branch conduit opening as determined by the infrared sensor to a location of the branch conduit opening according to a digital map of the main pipe obtained from a prior previous of the main pipe prior to lining.

Aspect 10. The system of aspect 8 wherein the controller is programmed to segregate infrared data acquired by the infrared scanner obtained by scanning the liner using the infrared scanner by ranges representing the highest and lowest temperatures expected to be found and infrared data outside those ranges is ignored by the controller in detecting the branch conduit opening.

Aspect 11. The system of aspect 10 wherein the ranges of the highest expected temperature and the lowest expected temperature are adjustable.

Aspect 12. The system of aspect 8 wherein the controller configured to execute a program to identify circular features in the data acquired from the scan and to determine deviations from circular features identified.

Aspect 13. The system of aspect 8 wherein the controller is programmed to assign a confidence score to the detected branch conduit opening.

Aspect 14. The system of aspect 13 wherein the controller is programmed to change the confidence score in an iterative process for locating the branch conduit opening.

Aspect 15. A method for re-establishing branch conduit connections in a host pipe that has been lined with a liner, the method including moving a robot through a lined host pipe, receiving a location of the robot in the lined host pipe based on a previous scan of the environment within the host pipe and location data generated by a sensor associated with the robot, receiving two-dimensional image data from a camera mounted on the robot, the two-dimensional image data including a view of the environment from a perspective of the robot, receiving infrared image data from an infrared camera mounted on the robot, fusing the infrared image data and the camera image data, when the location of the robot is adjacent to a branch conduit opening position that is covered by the liner, initiating a cutting process to re-establish fluid communication between a branch conduit and the host pipe through the branch conduit opening, receiving real time sensor data during the cutting process, and adjusting the cutting process based on the real time sensor data.

Aspect 16. The method of aspect 15 further including the step of tuning temperature gradients of the infrared camera based on environmental conditions of the host pipe.

Aspect 17. The method of aspect 16 wherein said step of tuning the temperature gradients includes using data from at least one or a combination of said steps of receiving the two-dimensional image data and fusing the two-dimensional image data with the infrared image data to retrain an infrared data processing algorithm.

Aspect 18. The method of aspect 17 wherein retraining is carried out by machine learning.

Aspect 19. The method of aspect 15 wherein said step of initiating the cutting process includes setting parameters for cutting the liner lining the host pipe to access the branch conduit opening into the host pipe.

Aspect 20. The method of aspect 19 wherein setting the parameters includes at least one of setting a cut based on a size of the opening of the branch conduit, setting a speed of the cut and setting a type of cut to be made.

Aspect 21. The method of aspect 15 wherein said step of initiating the cutting process includes performing a cutting operation using a cutter mounted on the robot and sensing conditions of at least one of the cutter and the robot, and altering the cutting operation based on the sensed conditions.

Aspect 22. The method of aspect 21 wherein the sensed conditions include movement of the robot.

Aspect 23. The method of aspect 22 wherein the sensed conditions include a cutting rate of the cutter through the liner in the cutting operation.

Aspect 24. The method of aspect 15 further including receiving a three-dimensional image data from a LIDAR sensor mounted on the robot and overlaying the LIDAR image data and at least one of the image data from the camera and the infrared image data.

Aspect 25. The method of aspect 24 further including evaluating the LIDAR image for a protrusion of the liner toward a central axis of the host pipe and identifying such a protrusion as a likely location of a branch conduit.

Aspect 26. The method of aspect 24 further including analyzing the camera image data, the infrared image data and the LIDAR image data in an ensemble predictor.

Aspect 27. The method of aspect 26 wherein analyzing the camera, infrared and LIDAR image data includes weighting at least one of the camera image data, the infrared image data and the LIDAR image data differently.

Aspect 28. A method of locating a branch conduit opening into a main pipe following lining the main pipe with a liner, the method including moving a robot down the lined main pipe, setting an upper end sensitivity range of an infrared scanner to exclude temperatures below a predetermined minimum temperature, setting a lower end sensitivity range to exclude temperatures above a predetermined maximum temperature, scanning the liner using the infrared scanner mounted on the robot, sensing with the infrared scanner a temperature drop outside the liner.

Aspect 29. The method of aspect 28 wherein said step of setting the upper end sensitivity range and setting the lower end sensitivity range are each based on the environmental conditions of the main pipe.

Aspect 30. A method for determining resistance of a material including positioning a robot adjacent to a target service, wherein the robot includes one or more joints and a plurality of sensors, wherein at least one of the one or more joints supports a cutting bit powered by a motor, initiating an interaction between the bit and the material at the target service, receiving feedback from one of the plurality of sensors, wherein the feedback is based on the interaction and is indicative of a resistance of the material, adjusting the bit based on the feedback.

Aspect 31. The method of aspect 30 wherein the sensors include one or more joint encoders and wherein the feedback includes a change in encoder positions over a time period.

Aspect 32. The method of aspect 31 further including comparing the change in position to a predicted position over the time period and determining a hardness of the material based on the comparing step.

Aspect 33. The method of aspect 30 wherein the feedback includes a speed of movement of one or more joints and a speed of the motor, and wherein the adjusting step is based on a comparison of the speed of movement of the one or more joint and the speed of the motor.

Aspect 34. The method of aspect 30 wherein the feedback includes a speed of movement of one or more joints and vibration data received from an inertia measurement unit (IMU) and wherein the adjusting step is based on a comparison of the speed of movement of the one or more joint and the vibration data.

Aspect Set I. Automatic Cutting Path Calculation

Aspect 1. A method for determining a cutting path to re-establish fluid communication between a main pipe and a branch conduit extending from the main pipe following lining of the main pipe with a liner, the method including computing an automated cutting path for a cutting tool as a function of shape and position data relating to an opening of the branch conduit into the main pipe, moving the cutting tool along the computed cutting path to cut the liner for reestablishing fluid communication between the branch conduit and the host pipe.

Aspect 2. The method of aspect 1 further including creating a digital model of the branch conduit opening based on the shape and position data, and wherein calculating the cutting path includes calculating the cutting path to avoid contact of the cutting tool with the modelled branch conduit opening.

Aspect 3. The method of aspect 2 wherein the digital model defines the shape and position of the branch conduit opening relative to the main pipe.

Aspect 4. The method of aspect 1 including executing machine learning to determine the path.

Aspect 5. A method for scanning and cutting a liner in a pipe, the method comprising, creating a digital map of an environment using a plurality of sensors, identifying a first location of a service based on a scan frame of reference, navigating a robot to the first location utilizing the digital map and based on a robot frame of reference, computing a cutting path based upon the digital map, and executing a cut at the first location.

Aspect 6. The method of aspect 5 further including identifying a second location of a second service and navigating the robot to the second location and executing a cut at the second location.

Aspect 7. The method of aspect 5 wherein identifying the first location includes determining the first location based on distance from an origin.

Aspect 8. The method of aspect 5 wherein computing the cutting path includes consideration of at least one of a type of cut, a bit selected for use to make the cut and a speed at which the cut is to be made.

Aspect 9. The method of aspect 5 wherein said step of creating a digital map is carried out by a first robot, and said steps of identifying a first location, navigating the robot and computing the cutting path are carried out by a second robot, the method further including determining a second frame of reference for sensors of the second robot and translating the data from the digital map created by the sensors of the first robot to the second frame of reference of the second robot thereby to compensate for differences in construction between the first robot and the second robot.

Aspect 10. The method of aspect 1 further including defining the scan frame of reference relative to a location in a global frame of reference and wherein said step of creating a digital map includes locating features within the pipe relative to the scan frame of reference.

Aspect 11. A system for cutting an opening in a liner lining a host pipe for fluid communication with a branch conduit, the system including a robot including a cutting tool extendable from the robot for cutting the liner, the robot being sized to be received in and move along the host pipe after liner is received in the host pipe, the robot being operatively connected to a controller configured to compute a cutting path for the cutting tool using data regarding the shape and position of an opening of the branch conduit into the main pipe, and to move the cutting tool along the computed cutting path to cut the liner for reestablishing fluid communication between the branch conduit and the host pipe.

Aspect 12. The system of aspect 11 wherein the controller is configured to reference a digital model of the branch conduit opening created in a scan of the host pipe prior to being lined with the liner, and wherein the controller computes the cutting path to avoid contact of the cutting tool with the modelled branch conduit opening.

Aspect 13. The system of aspect 12 wherein the digital model defines the shape and position of the branch conduit opening relative to the host pipe.

Aspect 14. The system of aspect 11 wherein the controller is programmed for machine learning to determine the cutting path.

Aspect 15. A system for scanning and cutting a liner in a pipe, the system including a robot having a cutting tool operable to cut through the liner, and a controller for controlling operation of the robot, the controller being configured to reference a digital map of an environment using a plurality of sensors made in a scan of the pipe prior to lining the pipe with the liner, controller being configured to identify a first location of a service based on a scan frame of reference, and navigating a robot to the first location utilizing the digital map and based on a robot frame of reference, the controller being programmed to compute a cutting path based upon the digital map, and control the cutting tool to execute a cut of the liner at the first location.

Aspect 16. The system of aspect 15 wherein the controller is configured to identify a second location of a second service, navigate the robot to the second location and executing a cut using the cutting tool at the second location.

Aspect 17. The system of aspect 15 wherein the controller identifies the first location by determining the first location based on distance from an origin.

Aspect 18. The system of aspect 15 wherein the controller computes the cutting path considering at least one of a type of cut, a bit selected for use to make the cut and a speed at which the cut is to be made.

Aspect 19. The system of aspect 15 wherein the controller receives the digital map that is created by a different robot, the controller being configured to determine a second frame of reference for sensors of the second robot and translating the data from the digital map created by the sensors of the first robot to the second frame of reference of the second robot thereby to compensate for differences in construction between the first robot and the second robot.

Aspect 20. A method including capturing sensor data from a plurality of sensors located within an environment, executing an artificial intelligence algorithm to locate features of the environment based on the sensor data, the located features including one or more service locations within the environment, creating a digital map of the environment based on the located features thereof, creating a scan frame of reference for each of the one or more service locations, generating an optimized path using the digital map for the robot to traverse the environment to avoid obstacles while navigating to the one or more service locations, navigating a robot adjacent to a first service location of the one or more service locations using the optimized path, the robot including a cutting tool, wherein the robot has a robot frame of reference and the navigation step is based on a comparison between the scan frame of reference and the robot frame of reference, initiating a first cutting operation at the first service location, generating sensor data during the first cutting operation, adjusting other planned cutting operations at the one or more service locations based on the generating step.

Aspect 21. A method of re-establishing fluid communication between a main pipe and a branch conduit extending from the main pipe following lining of the main pipe with a liner, the method including moving a robot supporting a cutting tool down the lined main pipe to a location proximate to the branch conduit, the cutting tool being selectively extendable from the robot for cutting the liner, extending a cutting tool from the robot toward the liner at a location where the branch conduit has an opening into the main pipe on an opposite side of the liner, cutting the liner with the cutting tool to form an initial cut, scanning the opening after the initial cut and cutting the liner with the cutting tool a second time using the data from the scanning of the opening to form an second cut.

Aspect 22. The method of aspect 21 wherein cutting the liner to form an initial cut includes moving the cutting tool in one of a spiral and zig zag motion.

Aspect 23 A system for of re-establishing fluid communication between a main pipe and a branch conduit extending from the main pipe following lining of the main pipe with a liner, the system including a robot, a cutting tool supported by the robot and extendable from the robot to cut the liner, sensors supported on the robot configured to perceive the environment in which the robot is positioned, and a controller operatively connected to the robot to control the robot to move down the lined main pipe to a location proximate to the branch conduit, the controller being configured to extend the cutting tool from the robot toward the liner at a location where the branch conduit has an opening into the main pipe on an opposite side of the liner, and to activate the cutting tool to cut the liner to form an initial cut, the controller being further configured to activate the sensors to scan the opening after the initial cut and to activate the cutting tool again to cut the liner a second time using the data from the scan of the opening to form a second cut.

Information Technology, Hardware and Software

While examples of the system contemplated herein have been described in connection with various computing devices/processors, the underlying concepts may be applied to any computing device, processor, or system capable of facilitating such a monitoring system. The various techniques described herein may be implemented in connection with hardware or software or, where appropriate, with a combination of both. Thus, the methods and devices may take the form of program code (i.e., instructions) embodied in concrete, tangible, storage media having a concrete, tangible, physical structure. Examples of tangible storage media include floppy diskettes, Compact Disc-Read-Only Memory devices (CD-ROMs), Digital Versatile Discs, or, Digital Video Discs (DVDs), hard drives, or any other tangible machine-readable storage medium (computer-readable storage medium). Thus, a computer-readable storage medium is not a signal. A computer-readable storage medium is not a transient signal. Further, a computer-readable storage medium is not a propagating signal. A computer-readable storage medium as described herein is an article of manufacture. When the program code is loaded into and executed by a machine, such as a computer, the machine becomes a device for the disclosed system. In the case of program code execution on programmable computers, the computing device will generally include a processor, a storage medium readable by the processor (including volatile or nonvolatile memory or storage elements), at least one input device, and at least one output device. The program(s) can be implemented in assembly or machine language, if desired. The language can be a compiled or interpreted language and may be combined with hardware implementations.

The methods and devices associated with the disclosed system also may be practiced via communications embodied in the form of program code that is transmitted over some transmission medium, such as over electrical wiring or cabling, through fiber optics, or via any other form of transmission, over the air (OTA), or firmware over the air (FOTA), wherein, when the program code is received and loaded into and executed by a machine, such as an Erasable Programmable Read-Only Memory (EPROM), a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

While the disclosure has been described in relation to a cloud-based network, it will be understood that the systems and methods disclosed herein may be deployed in both cellular networks and information technology infrastructure and support current and future use cases. Moreover, the architecture may also be used by carrier or third-party vendors to augment networks on the edge.

The methods and devices associated with a telecommunications system as described herein also may be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, or the like, the machine becomes an device for implementing telecommunications as described herein. When implemented on a general-purpose processor, the program code combines with the processor to provide a unique device that operates to invoke the functionality of a telecommunications system.

In describing preferred methods, systems, or apparatuses of the subject matter of the present disclosure as illustrated in the Figures, specific terminology is employed for the sake of clarity. The claimed subject matter, however, is not intended to be limited to the specific terminology so selected, and it is to be understood that each specific element includes all technical equivalents that operate in a similar manner to accomplish a similar purpose. In addition, the use of the word "or" is generally used inclusively unless otherwise provided herein.

This written description uses examples to enable any person skilled in the art to practice the claimed subject matter, including making and using any devices or systems and performing any incorporated methods. The patentable scope of the disclosed subject matter is defined by the claims and may include other examples that occur to those skilled in the art (e.g., skipping steps, combining steps, or adding steps between exemplary methods disclosed herein). Such other examples are intended to be within the scope of the claims if they have structural elements that do not differ from the literal language of the claims, or if they include equivalent structural elements with insubstantial differences from the literal languages of the claims.

The invention claimed is:

1. A method, comprising:

obtaining, by one or more processors and with at least one of a plurality of sensors, first data of a pipeline within an environment during a first scan operation, wherein a robot that carries the plurality of sensors is positioned in the environment;

obtaining, by the one or more processors, and with the at least one of the plurality of sensors, second data of the pipeline during a second scan operation, the second scan operation performed after the first scan operation;

determining, by the one or more processors of the robot, a difference between a feature of the pipeline detected in the first data and the feature of the pipeline detected in the second data; and in response to determining that the difference is indicative of an anomaly, generating, by the one or more processors, a navigation corrective instruction for execution by the robot.

2. The method of claim 1, wherein the at least one of the plurality of sensors comprises an inertial measurement unit (IMU).

3. The method of claim 2, wherein the navigation corrective instruction comprises an instruction for a reduction of a speed at which the robot is traversing the pipeline.

4. The method of claim 1, wherein the at least one of the plurality of sensors comprises a current sensor.

5. The method of claim 4, wherein the navigation corrective instruction comprises an instruction for reversing a direction in which the robot is traversing the pipeline.

6. The method of claim 1, wherein the at least one of the plurality of sensors comprises one or more joint encoders configured to encode a pose of an articulated portion of the robot, and wherein the navigation corrective instruction comprises an instruction for a change in the pose of the articulated portion of the robot.

7. The method of claim 6, wherein the at least one of the plurality of sensors further comprises an inertial measurement unit (IMU).

8. The method of claim 1, wherein the difference between the feature of the pipeline detected in the first data and the feature of the pipeline detected in the second data comprises a difference between a material property associated with the feature of the pipeline detected in the first data and a hardness of the feature of the pipeline detected in the second data.

9. The method of claim 1, further comprising generating, based on the second data, navigation instructions to traverse the pipeline.

10. The method of claim 1, wherein the difference between the feature of the pipeline detected in the first data and the feature of the pipeline detected in the second data comprises at least one of a bump, a crack, or an obstruction.

11. The method of claim 1, wherein the navigation corrective instruction comprises an instruct to navigate, by the robot, to a safe coordinate within the pipeline.

12. The method of claim 11, wherein the safe coordinate is a point in a center of the pipeline.

13. The method of claim 11, wherein the navigation corrective instruction further comprises an instruction to stop all joints of the robot.

14. The method of claim 1, wherein the difference between the feature of the pipeline detected in the first data and the feature of the pipeline detected in the second data comprises a difference between a diameter of the pipeline detected in the first data and a diameter of the pipeline detected in the second data, and further comprising determining a new frame of reference for the robot.

15. The method of claim 1, wherein the difference between the feature of the pipeline detected in the first data and the feature of the pipeline detected in the second data comprises a difference between a diameter of the pipeline detected in the first data and a diameter of the pipeline detected in the second data, and further comprising recalculating a distance traveled by the robot.

16. The method of claim 1, wherein the difference between the feature of the pipeline detected in the first data and the feature of the pipeline detected in the second data comprises an open service of the pipeline detected in the first data and an obscured service of the pipeline detected in the second data.

17. A system comprising:

a plurality of sensors carried by a robot;

storage media comprising instructions; and one or more processors configured to execute the instructions to:

obtain, via at least one of the plurality of sensors, first data of a pipeline within an environment during a first scan operation, wherein the robot is positioned in the environment;

obtain, via the at least one of the plurality of sensors, second data of the pipeline during a second scan operation, the second scan operation performed after the first scan operation;

determine a difference between a feature of the pipeline detected in the first data and the feature of the pipeline detected in the second data; and generate, in response to the determination that the difference is indicative of an anomaly, a navigation corrective instruction for the robot.

18. A non-transitory computer readable storage medium storing instructions that, when executed, cause one or more processors to:

obtain, with at least one of a plurality of sensors, first data of a pipeline within an environment during a first scan operation, wherein a robot that carries the plurality of sensors is positioned in the environment;

obtain, with the at least one of the plurality of sensors, second data of the pipeline during a second scan operation, the second scan operation performed after the first scan operation and after a liner has been installed within the pipeline;

determine a difference between a feature of the pipeline detected in the first data and the feature of the pipeline detected in the second data; and generate, in response to the determination that the difference is indicative of an anomaly, a navigation corrective instruction for the robot.

* * * * *